United States Patent
Moroi et al.

(10) Patent No.: US 8,869,837 B2
(45) Date of Patent: Oct. 28, 2014

(54) COMPRESSOR

(75) Inventors: Takahiro Moroi, Kariya (JP);
Masakazu Obayashi, Kariya (JP);
Naofumi Kimura, Kariya (JP);
Fumitaka Yoshizumi, Nisshin (JP);
Masakatsu Kuroishi, Seto (JP);
Yasuhiro Kondoh, Nisshin (JP);
Kazunori Yoshida, Nagoya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 0 days.

(21) Appl. No.: 13/637,558

(22) PCT Filed: Mar. 23, 2011

(86) PCT No.: PCT/JP2011/057024
§ 371 (c)(1),
(2), (4) Date: Sep. 26, 2012

(87) PCT Pub. No.: WO2011/125501
PCT Pub. Date: Oct. 13, 2011

(65) Prior Publication Data
US 2013/0014841 A1  Jan. 17, 2013

(30) Foreign Application Priority Data

Mar. 31, 2010 (JP) .................................. 2010-083803
Feb. 15, 2011 (JP) .................................. 2011-029432

(51) Int. Cl.
*F16K 15/16* (2006.01)
*F04B 27/08* (2006.01)
*F04B 39/10* (2006.01)

(52) U.S. Cl.
CPC ............. *F04B 27/08* (2013.01); *F04B 39/1073* (2013.01)
USPC ............................ 137/856; 137/527; 137/858

(58) Field of Classification Search
CPC ..... F16K 15/14; F16K 15/16; F04B 39/1073; F04B 39/1066; F04B 39/108
USPC .................. 137/527, 855, 858, 843, 852, 856
See application file for complete search history.

(56) References Cited

U.S. PATENT DOCUMENTS 4,781,540 A * 11/1988 Ikeda et al. .................... 417/269
5,178,183 A *  1/1993 Kim .............................. 137/527

(Continued)

FOREIGN PATENT DOCUMENTS

| | | |
|---|---|---|
| EP | 0962655 | 12/1999 |
| JP | 11-117867 | 4/1999 |

(Continued)

OTHER PUBLICATIONS

International Search Report dated Jun. 28, 2011, with English language translation.
International Preliminary Report on Patentability issued Nov. 13, 2012, English language translation PCT/JP2011/057024.
China Office action, mail date is Jun. 26, 2014, (For 201180015916.9).

*Primary Examiner* — Craig Schneider
*Assistant Examiner* — Jessica Cahill
(74) *Attorney, Agent, or Firm* — Greenblum & Bernstein, P.L.C.

(57) ABSTRACT

A compressor includes a discharge chamber, a compression chamber, a partition wall, and a discharge reed valve. The partition wall is arranged between the discharge chamber and the compression chamber and includes a fixing surface facing the discharge chamber. The partition wall includes a discharge port that communicates the discharge chamber and the compression chamber. The discharge reed valve includes a fixed portion, an intermediate portion, and a valve portion. The fixing surface includes a first groove portion, which extends around the discharge port, and a valve seat surface, which is arranged between the discharge port and the first groove portion. The first groove portion extends to a range overlapped with the intermediate portion. A part of the valve portion at a distal side does not close the first groove portion. The valve seat surface includes a receiving portion.

7 Claims, 16 Drawing Sheets

(56) References Cited

U.S. PATENT DOCUMENTS

| | | | |
|---|---|---|---|
| 5,586,874 A * | 12/1996 | Hashimoto et al. | 417/569 |
| 5,632,609 A * | 5/1997 | Hashimoto | 417/571 |
| 5,655,898 A * | 8/1997 | Hashimoto et al. | 417/569 |
| 5,884,665 A * | 3/1999 | Thurston et al. | 137/856 |
| 6,336,795 B1 * | 1/2002 | Yamada | 417/569 |
| 6,789,575 B2 * | 9/2004 | Park | 137/856 |
| 7,014,419 B2 * | 3/2006 | Farnsworth et al. | 415/113 |
| 7,014,433 B2 * | 3/2006 | Nieter | 417/569 |
| 2004/0216791 A1 * | 11/2004 | Inui et al. | 137/856 |
| 2008/0277008 A1 * | 11/2008 | MacBain et al. | 137/855 |
| 2011/0020158 A1 | 1/2011 | Ikeda et al. | |

FOREIGN PATENT DOCUMENTS

| | | |
|---|---|---|
| JP | 11-166480 | 6/1999 |
| JP | 2000-257561 | 9/2000 |
| JP | 2005-105975 | 4/2005 |
| WO | 2009/054209 | 4/2009 |
| WO | 2009/119316 | 10/2009 |

* cited by examiner

COMPRESSOR

TECHNICAL FIELD

The present invention relates to a compressor.

BACKGROUND ART

The following compressor is known (e.g., patent document 1). In this compressor, a valve plate is arranged between a discharge chamber and a compression chamber. A discharge port, which extends through the valve plate, can communicate the discharge chamber and the compression chamber. A discharge reed valve, which is located in the discharge chamber, opens and closes the discharge port.

The discharge reed valve includes a fixed portion, which is fixed to a fixing surface that is a surface of the valve plate at a side facing the discharge chamber, an intermediate portion, which extends along a longitudinal direction of the discharge reed valve from the fixed portion and can be lifted, and a valve portion, which extends along the longitudinal direction of the discharge reed valve from the intermediate portion to open and close the discharge port. An annular groove that surrounds the entire circumference of the discharge port is arranged in the fixing surface. A portion of the fixing surface between the discharge port and the annular groove forms a valve seat surface that is flush with the portion of the fixing surface outward from the annular groove. In a state in which the discharge reed valve is closing the discharge port, an outer edge (distal part) of the valve portion extends beyond the valve seat surface in the longitudinal direction of the discharge reed valve.

In this type of compressor, it is ideal that the discharge port immediately open at the moment the difference between the pressure in the discharge chamber and the pressure in the compression chamber exceeds zero. However, when lubricating oil is present like in an actual machine, as shown in FIG. 25, an adhesive force S acts in a direction inhibiting the opening of a discharge reed valve 81. Thus, the discharge reed valve 81 does not open the discharge port 82 until a force F produced by the pressure difference prevails over the adhesive force S. In such a situation, a bore inner pressure (pressure in the compression chamber) is as shown in FIG. 26. Such a phenomenon in which the bore inner pressure becomes higher than the discharging pressure is referred to as over-compression and causes power loss.

PRIOR ART DOCUMENT

Patent Document

Patent Document 1: Japanese Laid-Open Patent Publication No. 11-117867

DISCLOSURE OF THE INVENTION

Since such power loss leads to an increase in energy consumption. From the standpoint of reducing energy consumption, it is desirable that the power loss be further decreased. Further, in the compressor described above, the discharge reed valve may be damaged, and it is desirable that the durability be improved.

It is an object of the present invention to provide a compressor that can further reduce power loss and exhibiting higher durability.

In order to achieve the above object, the inventors have analyzed the conventional compressor in detail. As a result, the inventors have taken notice of the opening delay of the discharge reed valve and the moment the discharge reed valve closes.

(1) The opening delay of the discharge reed valve has gathered attention because it over-compresses gas and causes power loss of the compressor.

More specifically, the inventors observed the following phenomenon in the following compressor. As shown in parts (A) to (C) of FIG. 27, in the compressor, a valve plate 90 includes a discharge port 90a, which is circular as shown from above, and an annular groove 90b, which is concentric with the discharge port 90a. The discharge port 90a can communicate the compression chamber and the discharge chamber. A discharge reed valve 92 includes a fixed portion 92a, which is fixed to a fixing surface of the valve plate 90, an intermediate portion 92b, which extends along a longitudinal direction of the discharge reed valve 92 from the fixed portion 92a and can be lifted, and a valve portion 92c, which extends along the longitudinal direction of the discharge reed valve 92 from the intermediate portion 92b to open and close the discharge port 90a. In another known technique, the valve plate 90 includes a groove portion 90c that extends across the intermediate portion 92b of the discharge reed valve 92 in a lateral direction.

In the compressor, when the discharge reed valve 92 starts to open the discharge port 90a, as shown in part (B) of FIG. 27, a valve seat surface 90d of the valve plate 90 and an outer edge (distal part of valve portion 92c), which is distant from the intermediate portion 92b in the valve portion 92c, first separate and form a gap. Lubricating oil in the annular groove 90b flows into the gap. Thus, an adhesive force acts between the valve plate 90 and the distal part of the valve portion 92c and thereby inhibits the separation of the valve portion 92c. This delays the opening of the valve portion 92c.

In order to more specifically study the cause of opening delay of the valve portion 92c, the pressure between the valve plate 90 and the distal part of the valve portion 92c was calculated from the Reynolds equation, which represents oil film behavior. The result is shown in part (D) of FIG. 27. As apparent from part (D), the oil film pressure of the lubricating oil acts between the valve plate 90 and the distal end of the valve portion 92c. The oil film pressure is a negative pressure as compared with the surrounding pressure. The inventors refer to this action as a "reverse squeeze effect".

The "reverse squeeze effect" is a term coined by the inventors. An action that is known is referred to as the squeeze film effect (narrowing film effect), that is, when fluid is present in a gap between two parallel surfaces and the gap decreases at velocity V, due to the viscosity of the fluid, the fluid resists being pushed out of the gap and generates pressure (proportional to viscosity coefficient and velocity V). The squeeze film effect is a theory applied when two surfaces move toward each other but may also be applied when two surfaces move away from each other (velocity term is negative) as in the present case. Accordingly, in the present application, the theory applied when two surfaces separate is referred to as the "reverse squeeze effect" (negative squeeze effect).

In the compressor, even after the valve plate 90 and the distal part of the valve portion 92c separate from each other and start to open the discharge port 90a, as shown in portion (C) of FIG. 27, the valve plate 90 and the intermediate portion 92b separate and form a gap. Lubricating oil also flows into the gap. Thus, adhesive force also acts between the valve plate 90 and the intermediate portion 92b. The intermediate portion 92b is held by the adhesive force, and the opening of the intermediate portion 92b is delayed as compared with the valve portion 92c in the proximity of the discharge port 90a.

In order to further specifically study the cause of opening delay of the intermediate portion 92b, the pressure between the valve plate 90 and the intermediate portion 92b (between the annular groove 90b and the groove portion 90c) was calculated from the above-described equation. The result is shown in part (E) of FIG. 27. As apparent from part (E), the oil film pressure of the lubricating oil acts between the valve plate 90 and the intermediate portion 92b and is a negative pressure as compared with the surrounding pressure. That is, the reverse squeeze effect acts.

The inventors conducted a thorough research to resolve the phenomenon in which the reverse squeeze effect causes the adhesive force of the lubricating to act between a partition wall and the valve portion and between the partition wall and the intermediate portion thereby easily delaying the opening of the discharge reed valve.

(2) The moment the discharge reed valve closes has gathered attention because this causes fatigue failure in the discharge reed valve, which leads to reduction in the durability of the compressor.

More specifically, in the compressor, as shown in FIG. 28, at the moment the discharge reed valve 92 closes the discharge port 90a, after the valve portion 92c strikes the valve seat surface 90d, the section of the valve portion 92c in the vicinity of the distal part is displaced toward the inner side of the annular groove 90b by force of inertia. Repetition of the displacement causes fatigue failure of the valve portion 92c in the vicinity of location A. This tendency easily occurs particularly when the compressor is operated at high speeds.

The inventors conducted a simulation with the above compressor in the following manner. First, in the valve portion 92c, the striking of the valve seat surface 90d starts from the side of the intermediate portion 92b, and a stress wave is propagated along the left and right edges toward the distal side. At the valve portion 92c, the left and right stress waves interfere with each other at a section toward the distal side from location A that comes into contact with a radially inner edge of the annular groove 90b. In such compressor, it is assumed that the propagation of the stress waves does not attenuate because the distal part of the valve portion 92c extends toward the annular groove 90b beyond the valve seat surface 90d in the longitudinal direction D1 of the discharge reed valve 92. Further, in this compressor, a maximum stress is generated at the section of the valve portion 92c toward the distal side from location A.

The inventors conducted a thorough research to resolve the phenomenon in which fatigue failure easily occurs in the discharge reed valve.

In this manner, the inventors have completed the present invention.

One aspect of the present invention provides a compressor including a discharge chamber, a compression chamber, a partition wall, and a discharge reed valve. The partition wall is arranged between the discharge chamber and the compression chamber and includes a fixing surface facing the discharge chamber. The partition wall includes a discharge port that communicates the discharge chamber and the compression chamber. The discharge reed valve has a length extending along a longitudinal direction, a distal end, and a basal end. The discharge reed valve includes a fixed portion, an intermediate portion, and a valve portion. The fixed portion is located at the basal end and fixed to the fixing surface. The intermediate portion extends from the fixed portion along the longitudinal direction toward the distal end and is liftable relative to the fixing surface. The valve portion further extends from the intermediate portion along the longitudinal direction toward the distal end and is capable of opening and closing the discharge port. The fixing surface includes a first groove portion, which extends around the discharge port, and a valve seat surface, which is arranged between the discharge port and the first groove portion. The valve portion comes into contact with the valve seat surface to close the discharge port. When viewing the discharge reed valve from above in a state closing the discharge port, the first groove portion extends to a range overlapped with the intermediate portion. When viewing the valve portion from above in a state closing the discharge port, a part of the valve portion at a distal side in the longitudinal direction is formed not to close the first groove portion. The valve seat surface includes a receiving portion located in at least one of a distal side and a basal side in the longitudinal direction. The receiving portion bulges further toward at least one of the distal side and the basal side in the longitudinal direction than other portions in the valve seat surface.

In the compressor of the present invention, the part of the valve portion at the distal side in the longitudinal direction does not close the first groove portion. Thus, in a state in which the discharge reed valve closes the discharge port, the distal part of the valve portion does not come into contact with the lubricating oil collected in the first groove portion.

In this compressor, when the pressure of the compression chamber rises and the discharge reed valve thereby starts to open the discharge port, the fixing surface of the partition wall is separated from the part of the valve portion at the distal side in the longitudinal direction. This forms a gap. The lubricating oil collected in the groove portion does not come into contact with the distal part of the valve portion and thus does not enter the gap from the distal part of the valve portion. As a result, the supply of lubricating oil to the gap is stopped, the reverse squeeze effect is weakened between the fixing surface of the partition wall and the valve portion, and the adhesive force of the lubricating oil decreases. Thus, in this compressor, the timing can be advanced at which the fixing surface of the partition wall and the valve portion are separated from each other.

Accordingly, opening delays can be suppressed in the discharge reed valve, and over-compression of gas can be prevented.

Further, in this compressor, at the moment at which the discharge reed valve closes the discharge port, the valve portion strikes the valve seat surface. Here, the valve portion starts to strike the valve seal surface from the intermediate portion, and stress waves are propagated along the left and right edges toward the distal side. However, in this compressor, the distal part of the valve portion does not close the first groove portion. Thus, the stress waves are easily attenuated.

Further, in the compressor, the valve seat surface includes the receiving portion. The receiving portion is located toward either one of the distal side and basal side in the longitudinal direction from other portions of the valve seat surface. Thus, when the valve portion strikes the receiving portion, the lubricating oil on the receiving portion reduces the impact force and only small stress acts on the valve portion. Thus, a large stress is not produced at the distal end of the valve portion.

Accordingly, the compressor of the present invention can further reduce power loss and has a further superior durability.

Further, in the compressor, discharge pulsations can be decreased by suppressing opening delays in the discharge reed valve. Thus, the quietness of the compressor can be improved. Further, in the compressor, over-compression is decreased. Thus, exciting force, bearing load, piston side force, and the like have a tendency of decreasing. This reduces mechanical loss and suppresses wear. As a result, power consumption can be decreased, and reliability can be improved.

Preferably, the valve seat surface includes a first surface, a second surface, and an inclined surface. The first surface is located at a distal side of the discharge reed valve in the longitudinal direction and is flush with a portion of the fixing surface outside the first groove portion. The second surface is located at a basal side of the discharge reed valve in the longitudinal direction and has a lower height than the first surface. The inclined surface is located between the first surface and the second surface and has a height that gradually changes from the second surface to the first surface. The receiving portion is formed in the first surface.

In this case, in the compressor, the second surface is lower than the first surface. Thus, in comparison to when the entire valve seat surface is flush with a part of the fixing surface outside the first groove portion, at the moment the discharge reed valve closes the discharge port, the timing at which the valve portion strikes the second surface can be delayed. This delays the timing at which the stress waves, which are produced when the valve portion strikes the second surface, are propagated to the receiving portion formed in the first surface. Further, the basal part of the valve portion, which is bent along the second surface and the inclined surface, and gradually closes the discharge port from the basal side. This reduces impact when the distal end of the valve portion strikes the receiving portion. Further, in the compressor, the height of the inclined surface gradually changes from the second surface to the first surface. Thus, the stress waves, which are produced when the valve portion strikes the second surface, are not amplified when passing by the inclined surface. This further prevents a large stress from being produced at the distal end of the valve portion. As a result, damages to the discharge reed valve are effectively prevented, and a superior durability can be ensured.

Preferably, when a hypothetic center line is set along the longitudinal direction, the valve seat surface is asymmetric to the left and right of the center line.

In this case, when stress waves, which are produced when the valve portion strikes the second surface, are propagated toward the distal side, the stress wave propagated along the left edge and the stress wave propagated along the right edge are phase-shifted from each other and propagated to the receiving portion formed in the first surface. As a result, the phase-shifted stress waves merge at the receiving portion and cancel each other. This further prevents a large stress from being produced at the distal end of the valve portion. As a result, the compressor further effectively prevents damages to the discharge reed valve, and ensures a further superior durability.

When viewed from above, in addition to being circular, the discharge port may be elliptic or polygonal. The first groove portion may have any shape as long as it extends around the discharge port. For example, the first groove portion may be a C-shaped groove that is generally C-shaped. In addition to an arc-shaped, a generally C-shaped form includes a shape bent like a polygonal line.

Preferably, the first groove portion is an annular groove surrounding the discharge port in a circumferential direction.

In this case, in a state in which the discharge reed valve closes the discharge port, the intermediate portion is overlapped with the arc portion of the annular groove over a larger range. Thus, the area in which the fixing surface comes into contact with the intermediate portion is decreased by the overlapping area.

Preferably, the first groove portion has a C-shaped form surrounding the discharge port in a circumferential direction excluding a portion at the distal side in the longitudinal direction.

In this case, by increasing the distance between the two opposing ends of the C-shaped groove, the receiving portion can be enlarged. Thus, when the valve portion of the discharge reed valve strikes the receiving portion, the lubricating oil on the large receiving portion ensures that the impact force is reduced. Thus, only a small stress acts on the valve portion, and a large stress is not produced at the distal end of the valve portion. As a result, in this compressor, damages to the discharge reed valve can be effectively prevented, and superior durability can be ensured.

Preferably, the fixing surface includes a second groove located at a basal side of the discharge port in the longitudinal direction, and when viewing the discharge reed valve from above in a state closing the discharge port, the second groove extends across the intermediate portion in a lateral direction.

In this case, in a state in which the discharge reed valve closes the discharge port, foreign substances are prevented from being caught in the intermediate portion.

Preferably, when viewing the discharge reed valve from above in a state closing the discharge port, the fixing surface includes a communication groove located in a range overlapping the intermediate portion and extending along the longitudinal direction to communicate the first groove portion and the second groove portion.

Portions of the fixing surface other than the communication groove may form a contact portion that comes into contact with the discharge reed valve. As described above, when the discharge reed valve starts to open the discharge port, multiphase jet flow of gas and lubricating oil easily collects in the first groove portion at the range overlapped with the intermediate portion. In this respect, the formation of the communication groove discharges the jet flow from the first groove portion via the communication groove and the second groove portion outward in the lateral direction of the reed valve. This blows away the lubricating oil collected in the first groove portion, the lubricating oil collected between the fixing surface and the intermediate portion, and the lubricating oil collected in the second groove portion. Further, the communication groove decreases the area of contact between the fixing surface and the intermediate portion. Thus, the compressor further advances the timing at which the fixing surface and the intermediate portion separate from each other. As a result, this ensures that the advantages of the present invention are obtained.

A specific example of the communication groove and the contact portion is a structure in which a single communication groove is formed at a middle part in the lateral direction (direction perpendicular to the longitudinal direction) of the intermediate portion, and two contact portions are formed at two opposite sides of the communication groove. With such a simple structure, the communication groove can effectively blow away the lubricating oil collected in the first and second groove portions and the lubricating oil collected between the fixing surface and the intermediate portion. Further, the two contact portions ensure that the intermediate portion is supported. A plurality of communication grooves may also be formed.

When the compressor is a scroll type compressor, a vane type compressor, or the like, a single discharge port may be formed in the partition wall. When the compressor is a swash plate type compressor or the like, a plurality of discharge ports may be concentrically formed in the partition wall.

When a plurality of discharge ports are concentrically formed in the partition wall, each discharge port is circular as viewed from above, and the outer circumference of each first groove portion is C-shaped or arc-shaped, each discharge reed valve may form a discharge valve plate including a plurality of intermediate portions and valve portions extending radially from a fixed portion. When viewing each discharge reed valve from above in a state closing the discharge port, each intermediate portion is rectangular and has long sides extending toward the distal side in the longitudinal direction, and the outer edge of the valve portion is a semicircular arc and has a diameter that is the same as the short sides of the intermediate portion. In this case, a plurality of circular discharge ports are formed in the partition wall, and the plurality of discharge reed valves are formed by a starfish-shaped discharge valve plate. When fixing the discharge valve plate to the fixing surface of the valve plate, it is difficult to align the discharge reed valves with the discharge ports in the circumferential direction due to manufacturing tolerances and assembly tolerances. However, the present invention ensures that each discharge port is closed and that the advantages of the present invention are obtained. This is because the diameter of the valve portion can be greater than the diameter of the valve seat surface in the direction orthogonal to the longitudinal direction of the valve portion to ensure that the valve portion comes into contact with the valve seat surface and closes the discharge port. Further, in the valve seat surface, the receiving portion, which is the distal part, is formed to be larger in the radial direction than other portions.

When forming such a valve seat surface, it is preferable that an angle formed by a line drawn from the center of a discharge port toward one end in the circumferential direction of the receiving portion and a line drawn from the center of the discharge port toward the other end in the circumferential direction of the receiving portion is preferably 80° or less.

DETAILED DESCRIPTION OF THE PREFERRED EMBODIMENTS

First to ninth embodiments of the present invention will now be described with reference to the drawings.

First Embodiment

Figure 1:
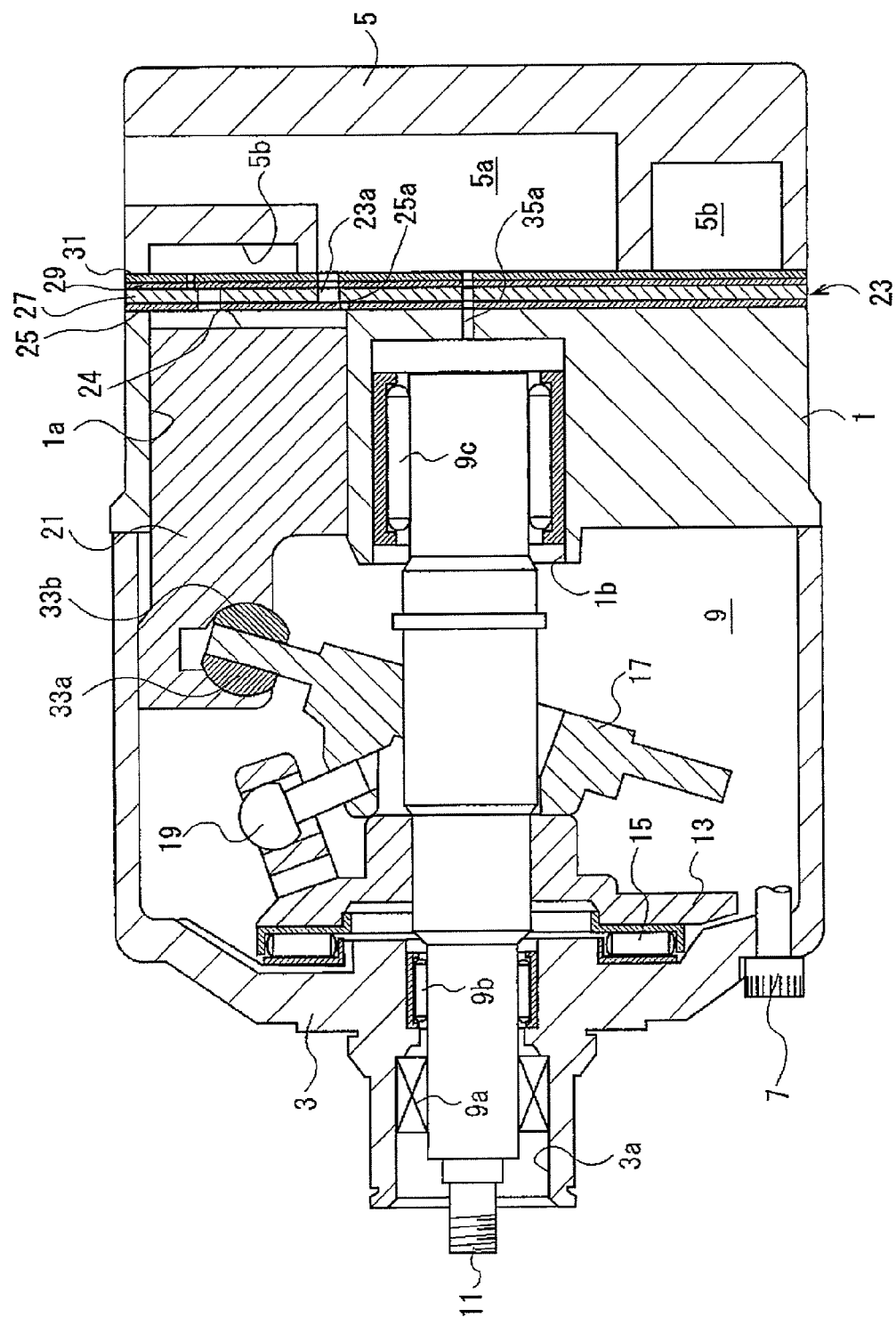
FIG. 1 is a cross-sectional view of a compressor according to a first embodiment of the present invention.

A compressor of a first embodiment is a variable displacement type swash plate compressor. As shown in FIG. 1, the compressor is provided with a cylinder block 1 including a plurality of cylinder bores 1a. The cylinder bores 1a are concentrically arranged at equal angular intervals and extend parallel to each other. The cylinder block 1 is held between a front housing 3, which is located toward the front, and a rear housing 5, which is located toward the rear, and fastened by a plurality of bolts 7 in this state. A crank chamber 9 is formed in the cylinder block 1 and the front housing 3. The rear housing 5 includes a suction chamber 5a and a discharge chamber 5b.

The front housing 3 includes a shaft hole 3a, and the cylinder block 1 includes a shaft hole 1b. A drive shaft 11 is supported in a rotatable manner by a shaft seal 9a and radial bearings 9b and 9c in the shaft holes 3a and 1b. A pulley or an electromagnetic clutch (not shown) is arranged on the drive shaft 11. A belt (not shown), which is driven by an engine of a vehicle, runs about the pulley or an electromagnetic clutch pulley.

The drive shaft 11 is press-fitted to a lug plate 13, which is arranged in the crank chamber 9. A thrust bearing 15 is arranged between the lug plate 13 and the front housing 3. The drive shaft 11 is inserted through a swash plate 17, which is arranged in the crank chamber 9, to support the swash plate 17. A link mechanism 19, which supports the swash plate 17 in a tiltable manner, couples the lug plate 13 and the swash plate 17.

Each cylinder bore 1a accommodates a piston 21, which can reciprocate therein. A valve unit 23 is arranged between the cylinder block 1 and the rear housing 5. As shown in the enlarged view of FIG. 2, the valve unit 23 includes an suction valve plate 25, which is in contact with a rear end face of the cylinder block 1, a valve plate 27, which is in contact with the suction valve plate 25, a discharge valve plate 29, which is in contact with the valve plate 27, and a retainer plate 31, which is in contact with the discharge valve plate 29. The retainer plate 31 also functions as a gasket. The suction valve plate 25, the valve plate 27, the discharge valve plate 29, and the retainer plate 31 are stacked in this order to form the valve unit 23.

As shown in FIG. 1, front and rear shoes 33a and 33b, which form a pair, are arranged between the swash plate 17 and each piston 21. Each pair of the shoes 33a and 33b convert the wobbling movement of the swash plate 17 into a reciprocating movement of the piston 21.

The crank chamber 9 and the suction chamber 5a are connected by a bleed passage 35a, and the crank chamber 9 and the discharge chamber 5b are connected by a supply passage (not shown). A displacement control valve (not shown) is arranged in the supply passage. The displacement control valve is formed so that it can vary the open degree of the supply passage in accordance with the suction pressure. A condenser is connected by a pipe to the discharge chamber 5b. The condenser is connected by a pipe to an evaporator via an expansion valve, and the evaporator is connected by a pipe to the suction chamber 5a of the compressor. The cylinder bores 1a, the pistons 21, and the valve unit 23 form compression chambers 24.

A plurality of suction ports 23a are formed in the valve plate 27, the discharge valve plate 29, and the retainer plate 31 to communicate the suction chamber 5a and the compression chambers 24. The suction valve plate 25 includes a plurality of suction reed valves 25a that open and close the suction ports 23a.

Figure 2:
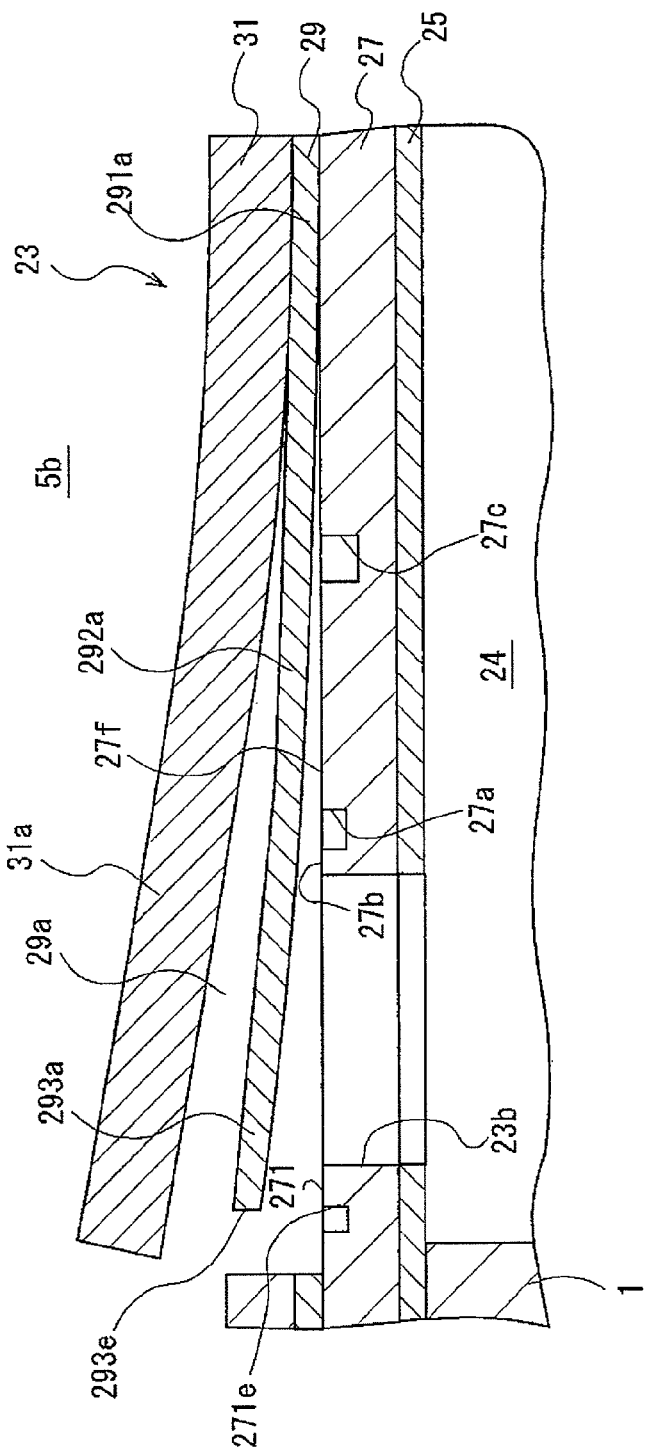
FIG. 2 is an enlarged cross-sectional view showing a state in which a discharge reed valve opens a discharge port in the compressor of FIG. 1.
Figure 3:
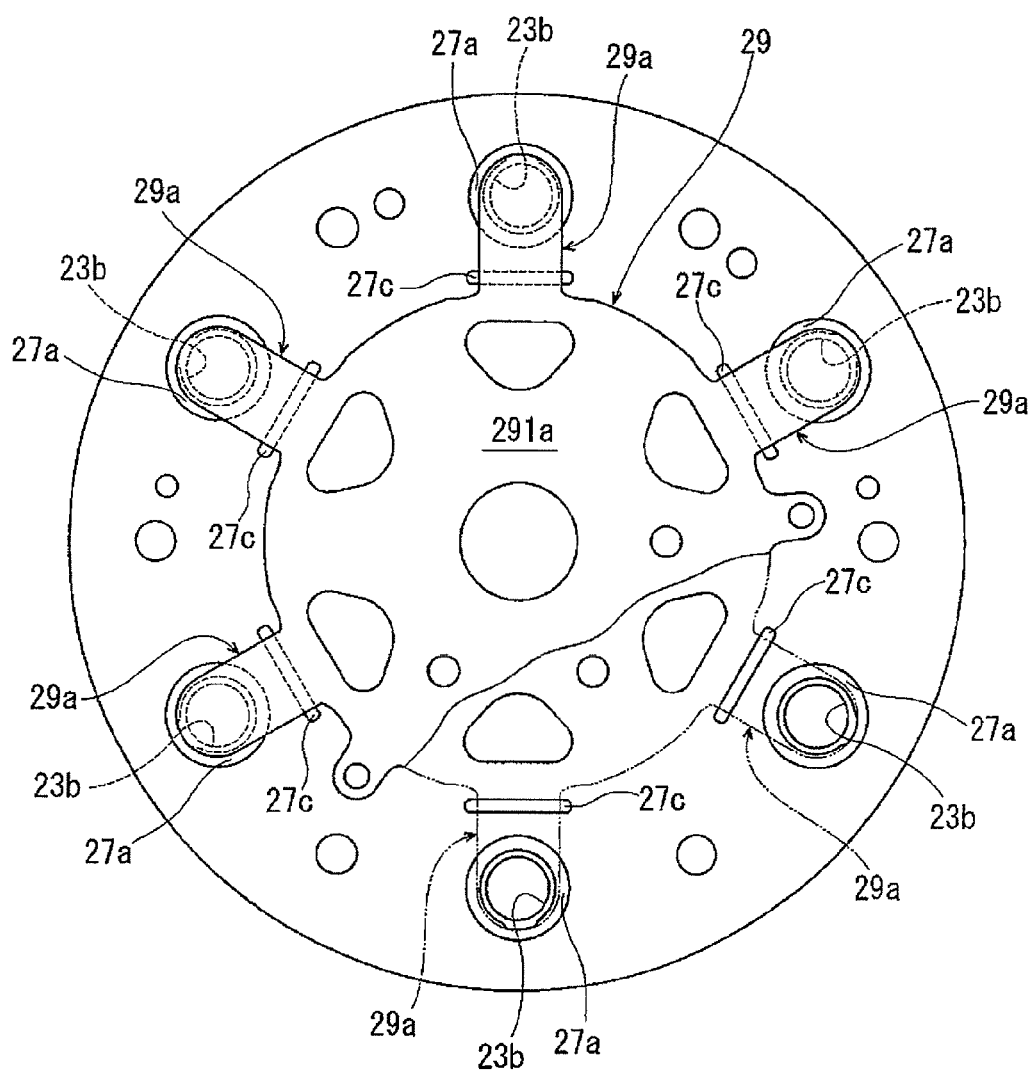
FIG. 3 is a plan view showing a valve plate and a discharge valve plate, which includes a plurality of discharge reed valves, in the compressor of FIG. 1.

As shown in FIGS. 2 to 5, a plurality of discharge ports 23b are formed in the suction valve plate 25 and the valve plate 27 to communicate the compression chambers 24 and the discharge chamber 5b. A plurality of discharge reed valves 29a are formed in the discharge valve plate 29 to open and close the discharge ports 23b. The retainer plate 31 includes a retainer 31a that restricts the lift length of each discharge reed valve 29a. In the present embodiment, as shown in FIG. 3, the discharge valve plate 29 includes a circular portion and a plurality of extended portions, which extend radially outward in the radial direction from the circular portion. The extended portions form the discharge reed valves 29a that open and close the discharge ports 23b.

As shown in FIGS. 2 to 5, the discharge port 23b is circular as viewed from above. An annular groove 27a, which is a ring-shaped first groove portion surrounding the entire circumference of the discharge port 23b, is arranged in a fixing surface 27f, which is the surface of the valve plate 27 at the side facing the discharge chamber 5b. An outer circumferential edge of the annular groove 27a is concentric with the discharge port 23b. In the fixing surface 27f, a ring-shaped region located between the discharge port 23b and the annular groove 27a forms a valve seat surface (also referred to as eyeglass portion) 27b that is flush with a portion of the fixing surface 27f located outward from the annular groove 27a. In the compressor, the suction valve plate 25 and the valve plate 27 serve as a partition wall.

The discharge reed valve 29a includes a fixed portion 291a, which is fixed to the fixing surface 27f of the valve plate 27, six intermediate portions 292a, which extend along longitudinal directions D1 from the fixed portions 291a and which can be lifted, and six valve portions 293a, which extend along the longitudinal directions D1 from the intermediate portions 292a to open and close the discharge ports 23b. In the present embodiment, each longitudinal direction D1 is parallel to the fixing surface 27f and extends outward in the radial direction from the drive shaft 11. In other words, the longitudinal direction D1 is a direction from a basal end toward a distal end of each discharge reed valve 29a.

Figure 4:
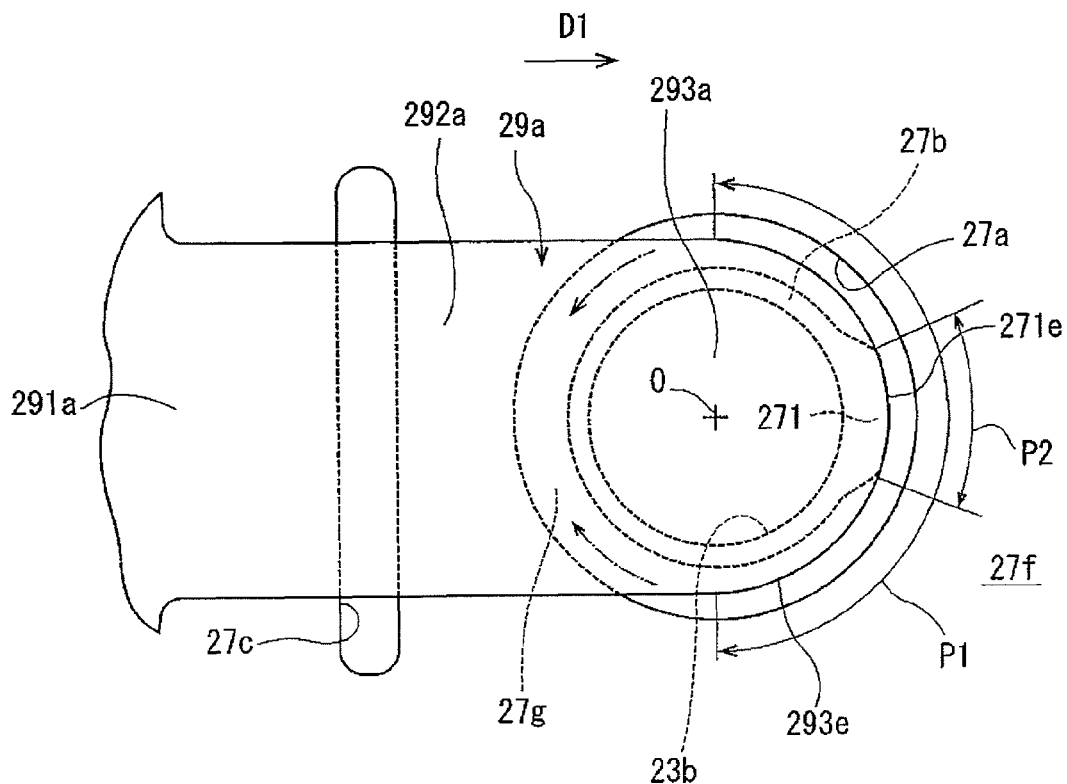
FIG. 4 is an enlarged plan view showing a state in which the discharge reed valve closes the discharge port in the compressor of FIG. 1.

As shown in FIG. 4, when viewing the intermediate portion 292a and the valve portion 293a from above, the intermediate portion 292a has a rectangular shape in which the long sides extend toward the distal side in the longitudinal direction D1. An outer edge 293e directed toward the distal side of the valve portion 293a in the longitudinal direction D1 is a semicircular arc that is concentric with the discharge port 23b and the annular groove 27a. The outer edge 293e has a diameter conforming to the short sides of the intermediate portion 292a. In FIG. 4, the range of the outer edge 293e is indicated by a double-headed arrow line P1. More specifically, an angle formed by a line drawn from a center O of the discharge port 23b toward one end of the outer edge 293e and a line drawn from the center O toward the other end of the outer edge 293e is 180°. The diameter of the valve portion 293a in a direction orthogonal to the longitudinal direction D1 is greater than the diameter of the valve seat surface 27b in the longitudinal direction D1.

A distal portion of the valve seat surface 27b in the longitudinal direction D1 defines a receiving portion 271. The receiving portion 271 bulges further toward the distal side in the longitudinal direction D1 than other parts of the valve seat surface 27b. That is, the receiving portion 271 bulges further outward in the direction of the discharge port 23b than other parts of the valve seat surface 27b. In this manner, with regard to dimensions in the radial direction of the discharge port 23b, the receiving portion 271 has larger dimensions than other portions. Thus, with regard to the area per unit length along the circumferential direction of the discharge port 23b, the receiving portion 271 has a larger area than the other portions in the valve seat surface 27b. In the radially inner edge of the annular groove 27a, the portion that conforms with the radially outer edge of the receiving portion 271 defines an inner edge 271e. The range of the inner edge 271e is indicated by a double-headed arrow line P2. The range of the receiving portion 271 in the circumferential direction, that is, an angle formed by a line drawn from the center O of the discharge port 23b toward one end in the circumferential direction of the receiving portion 271 and a line drawn from the center O toward the other end in the circumferential direction of the receiving portion 271 is preferably 80° or less. A central portion of the outer edge 293e conforms with the inner edge 271e, and the central portion of the outer edge 293e does not extend over the annular groove 27a in a state in which the discharge port 23b is closed by the valve portion 293a. In other words, when viewing the valve portion 293a in a state closing the discharge port 23b from above, the valve portion 293a has a distal part that does not close the annular groove 27a in the longitudinal direction.

As shown in FIGS. 2 to 5, a second groove portion 27c is arranged in the fixing surface 27f at the basal side of the discharge port 23b in the longitudinal direction D1 extended across the intermediate portion 292a in its lateral direction. As shown in FIG. 4, when viewing the second groove portion 27c from above, the second groove portion 27c has the shape of an oblong ellipse that is orthogonal to the longitudinal direction D1. The second groove portion 27c is deeper than the annular groove 27a.

In the above compressor, when the drive shaft 11 is driven and rotated, the lug plate 13 and the swash plate 17 are synchronously rotated with the drive shaft 11, and the pistons 21 are reciprocated in the cylinder bores 1a with a stroke corresponding to the tilt angle of the swash plate 17. Thus, refrigerant gas is drawn from the suction chamber 5a into each compression chamber 24 and compressed. Then, the refrigerant gas is discharged to the discharge chamber 5b. The refrigerant gas that undergoes compression in the compressor contains lubricating oil in the form of a mist. The lubricating oil collects on sliding and moving parts such as the pistons 21, the shoes 33a and 33b, the swash plate 17, and the like to suppress wear. The lubricating oil is also collected in the annular grooves 27a and the second groove portions 27c.

Figure 5:
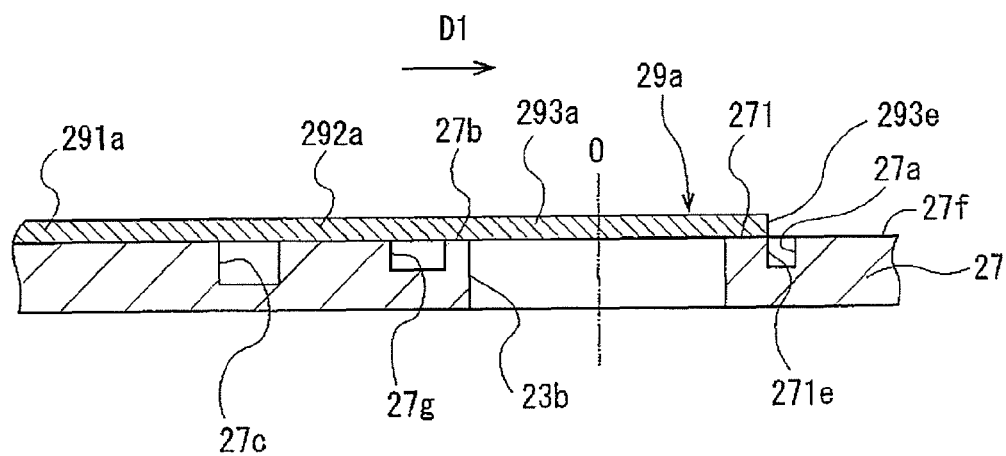
FIG. 5 is an enlarged cross-sectional view showing a state in which the discharge reed valve closes the discharge port in the compressor of FIG. 1.

In this state, as shown in FIG. 2, the discharge reed valve 29a is elastically deformed at the intermediate portion 292a due to the difference between the pressure in the discharge chamber 5b and the pressure in the compression chamber 24. This opens the discharge port 23b at the valve portion 293a. As shown in FIG. 5, the valve portion 293a does not open the discharge port 23b until the pressure difference prevails over the adhesive force of the intermediate portion 292a.

In the compressor of the first embodiment described above, the central part (distal part) of the outer edge 293e of the valve portion 293a does not extend over the annular groove 27a. Thus, as shown in the enlarged view of FIG. 6, when the discharge reed valve 29a closes the discharge port 23b, the outer edge 293e of the valve portion 293a does not come into contact with lubricating oil 40, which is collected in the annular groove 27a.

Figure 7:
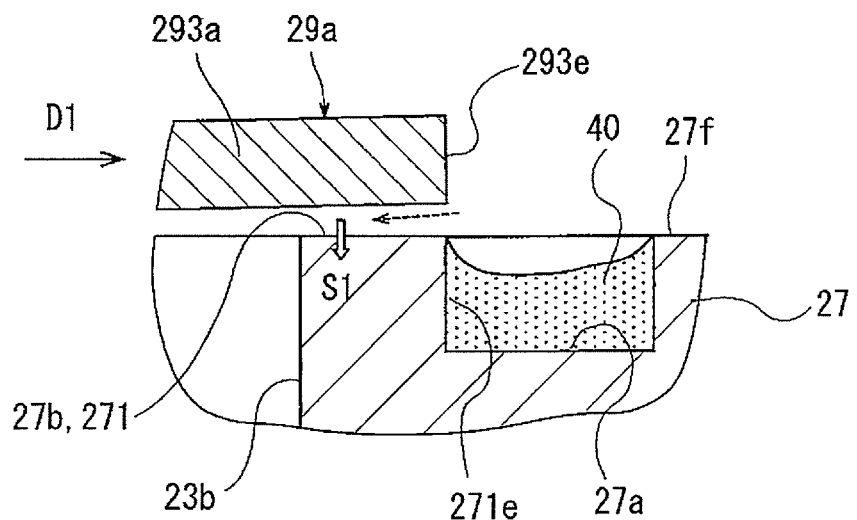
FIG. 7 is an enlarged cross-sectional view showing a state in which the discharge reed valve starts to open the discharge port in the compressor of FIG. 1.

In the compressor, as shown in FIG. 7, when the discharge reed valve 29a starts to open the discharge port 23b, the valve seat surface 27b and the outer edge 293e of the valve portion 293a first separate from each other and thereby form a gap. In this case, the lubricating oil 40 collected in the annular groove 27a does not come into contact with the outer edge 293e of the valve portion 293a and thus does not flow into the gap along the outer edge 293e. This blocks the supply of the lubricating oil 40 between the valve seat surface 27b and the part of the valve portion 293a at the side of the outer edge 293e, lowers the negative pressure caused by the reverse squeeze effect, and decreases the adhesive force (indicated by arrow S1 in FIG. 7) of the lubricating oil 40 between the valve seat surface 27b and the part of the valve portion 293a at the side of the outer edge 293e. Thus, the timing at which the valve seat surface 27b and the part of the valve portion 293a at the side of the outer edge 293e separate from each other is advanced.

Accordingly, opening delays of the discharge reed valve 29a can be suppressed. This phenomenon was confirmed when the inventors made a visible model of the discharge reed valve 29a and the discharge port 23b and observed the model with a high-speed video camera. In this manner, over-compression of the refrigerant gas does not occur in the compressor.

Figure 6:
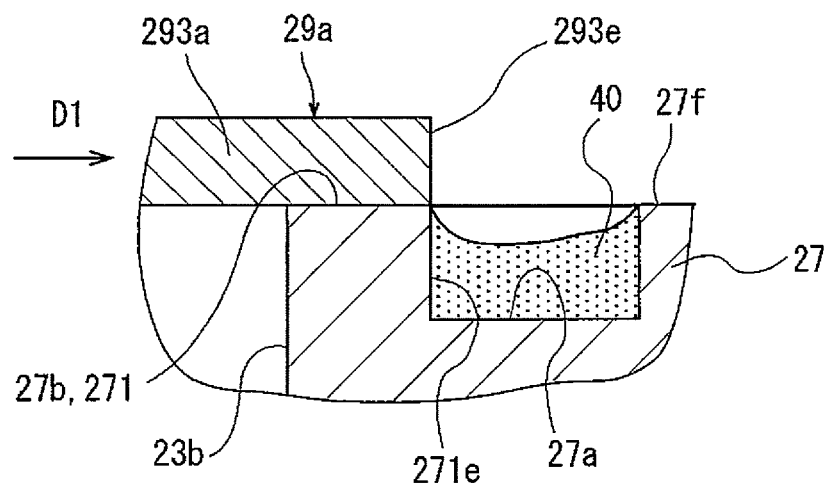
FIG. 6 is an enlarged cross-sectional view showing a state in which the discharge reed valve closes the discharge port in the compressor of FIG. 1.

Further, in the compressor, as shown in FIG. 6, the valve portion 293a strikes the valve seat surface 27b at the moment the discharge reed valve 29a closes the discharge port 23b. In this case, the valve portion 293a starts to strike the valve seat surface 27b from a part located toward the intermediate portion 292a, and stress waves are propagated along the left and right edges toward the distal side. However, in the compressor, the receiving portion 271 bulged further toward the distal side in the longitudinal direction D1 than other parts of the valve seat surface 27b so that the central portion of the outer edge 293e does not extend over the annular groove 27a. This increases the squeeze effect of the lubricating oil on the receiving portion 271 when the valve portion 293a strikes the receiving portion 271 and easily attenuates the stress waves. Thus, the striking force is reduced, only a small stress acts on the valve portion 293a, and a large stress is not produced at the distal end of the valve portion 293a.

Accordingly, the compressor can further reduce power loss and exhibit higher durability.

In the compressor, discharging pulsation can be reduced by suppressing the opening delay of the discharge reed valve 29a. This improves the quietness of the compressor. Further, in the compressor, the peak pressure in the compression chamber 24 can be lowered. Thus, the maximum compression load can be reduced, and the reliability can be increased for the thrust bearing 15, the surfaces of contact of the shoes 33a and 33b and the pistons 21, the sliding surfaces of the shoes 33a and 33b and the swash plate 17, and the like.

In the compressor, the annular groove 27a is arranged in the fixing surface 27f, as shown in FIG. 4. Thus, the intermediate portion 292a and an arc portion 27g (shown in FIG. 4) of the annular groove 27a are overlapped over a wide range in a state in which the discharge reed valve 29a closes the discharge port 23b. The overlapping area reduces the area of contact between the fixing surface 27f and the intermediate portion 292a. This shortens opening delays of the discharge reed valve 29a.

Further, in the compressor, the second groove portion 27c is arranged in the fixing surface 27f. Thus, foreign substances are prevented from being caught by the intermediate portion 292a in a state in which the discharge reed valve 29a closes the discharge port 23b.

Moreover, in the compressor, the intermediate portion 292a has a rectangular shape in which the long sides extend toward the distal side of the longitudinal direction D1 when viewing the intermediate portion 292a and the valve portion 293a from above. The outer edge 293e of the valve portion 293a is a semicircular arc concentric with the annular groove 27a and having a diameter corresponding to the short sides of the intermediate portion 292a. In this manner, the discharge reed valve 29a has a simple shape and thus reduces the manufacturing cost of the compressor.

In the compressor, the circular discharge ports 23b are formed in the suction valve plate 25 and the valve plate 27, and the discharge reed valves 29a are arranged on the discharge valve plate 29, which is starfish-shaped. When fixing the discharge valve plate 29 to the fixing surface 27f of the valve plate 27, it is difficult to align the discharge reed valves 29a with the discharge ports 23b in the circumferential direction due to manufacturing tolerances and assembly tolerances. However, in this compressor, the diameter of the valve portion 293a is greater than the diameter of the valve seat surface 27b in the direction orthogonal to the longitudinal direction D1. Further, in the valve seat surface 27b, the receiving portion 271, which is the distal part, is formed to be larger in the radial direction than other portions. Thus, the compressor ensures that the valve portion 293a comes into contact with the valve seat surface 27b and closes the discharge port 23b.

Second Embodiment

Figure 8:
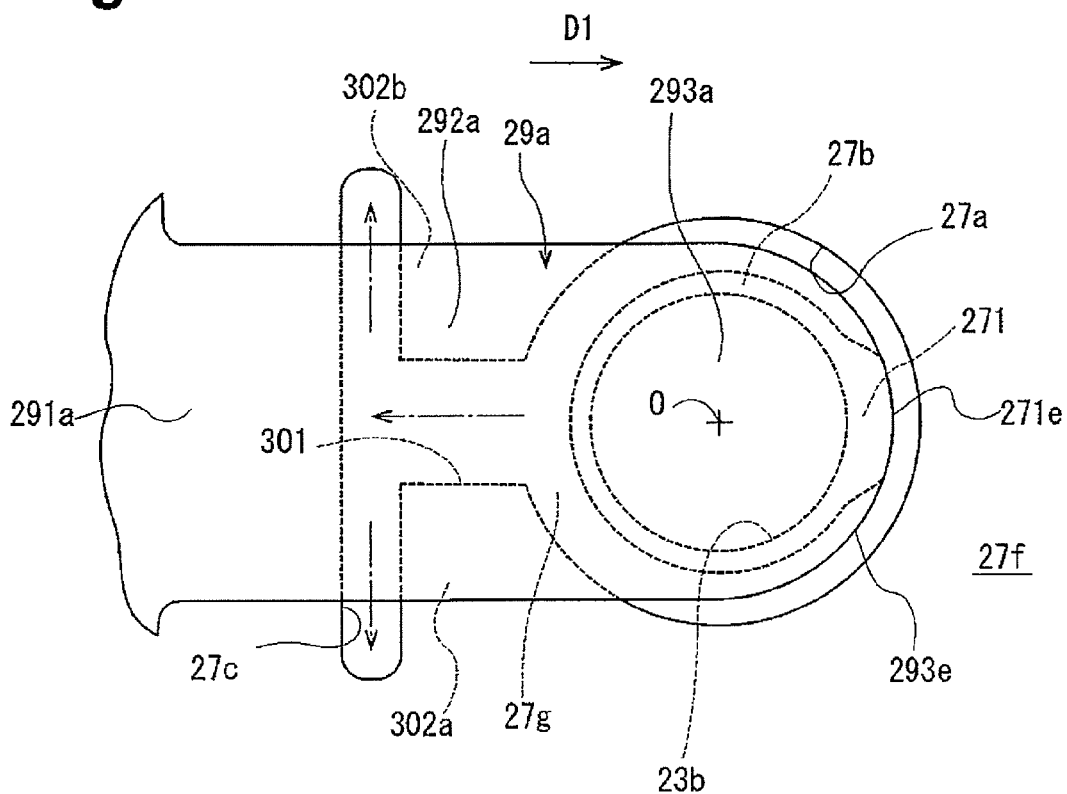
FIG. 8 is an enlarged plan view showing a state in which a discharge reed valve closes a discharge port in a compressor according to a second embodiment of the present invention.
Figure 9:
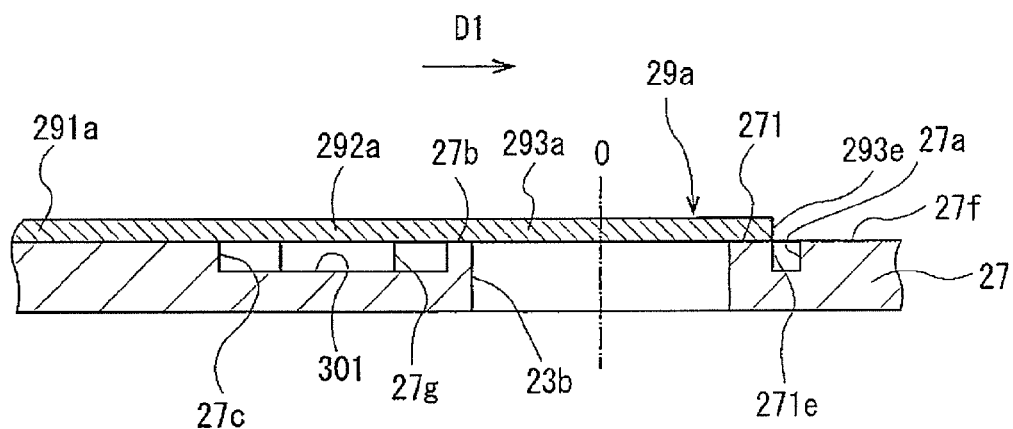
FIG. 9 is an enlarged cross-sectional view showing a state in which the discharge reed valve closes the discharge port in the compressor of FIG. 8.

In a compressor of second embodiment, as shown in FIGS. 8 and 9, a communication groove 301 is added to the compressor of the first embodiment. Otherwise, the structure is the same as the compressor of the first embodiment. Thus, same reference characters are given to same components, and such components will not be described in detail.

The communication groove 301 is formed in the fixing surface 27f to communicate the annular groove 27a and the second groove portion 27c. As shown in FIG. 8, when viewing the discharge reed valve 29a from above in a state closing the discharge port 23b, the communication groove 301 has smaller width than the intermediate portion 292a and extends along the longitudinal direction D1 through the laterally middle part of the intermediate portion 292a. The annular groove 27a, the second groove portion 27c, and the communication groove 301 have the same depth.

Portions of the fixing surface 27f other than the communication groove 301 form contact portions 302a and 302b that come into contact with the discharge reed valve 29a. The contact portions 302a and 302b are located at the two lateral sides of the communication groove 301 in the fixing surface 27f. Further, the contact portions 302a and 302b are overlapped with the intermediate portion 292a when the discharge reed valve 29a is in state of closing the discharge port 23b as viewed from above. In the present embodiment, the width of the communication groove 301 is about 50% to 75% the width of the intermediate portion 292a. This ensures that the contact portions 302a and 302b support the intermediate portion 292a.

In the compressor, when the discharge reed valve 29a starts to open the discharge port 23b, some of a multiphase jet flow of the refrigerant gas and the lubricating oil enters into the annular groove 27a. When the discharge port 23b further opens, the jet flow is ejected in all directions. However, the jet flow directed toward the intermediate portion 292a is guided to the second groove portion 27c through the communication groove 301. This blows away the lubricating oil from the overlapping range (arc portion 27g).

When reaching the second groove portion 27c from the communication groove 301, the jet flow is discharged outward in the lateral direction of the discharge reed valve 29a along the second groove portion 27c that extends across the intermediate portion 292a. This blows away the lubricating oil from the fixing surface 27f and the intermediate portion 292a and from the second groove portion 27c. Further, the communication groove 301 decreases the area of contact between the fixing surface 27f and the intermediate portion 292a. Thus, the compressor further advances the timing at which the fixing surface 27f and the intermediate portion 292a separate from each other. As a result, this ensures that the advantages of the present invention are obtained. Other advantages are the same as the first embodiment.

Third Embodiment

Figure 10:
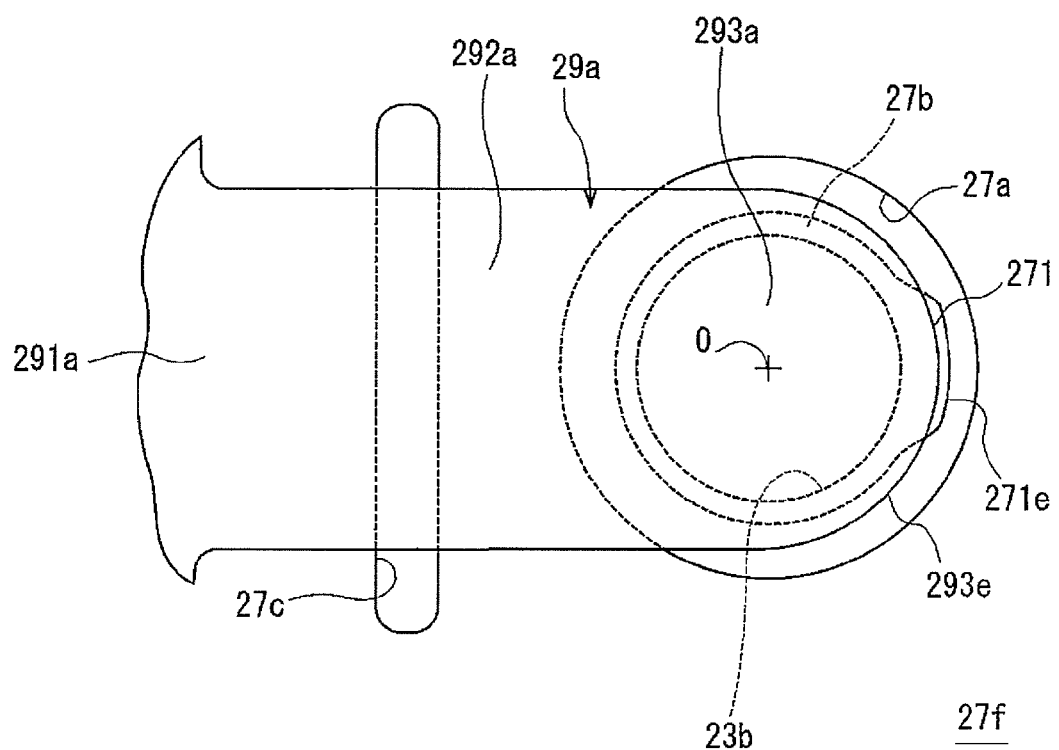
FIG. 10 is an enlarged plan view showing a state in which a discharge reed valve closes a discharge port in a compressor according to a third embodiment of the present invention.

In a compressor of a third embodiment, as shown in FIG. 10, when the valve portion 293a is in a state closing the discharge port 23b is viewed from above, the outer edge 293e directed toward the distal side of the valve portion 293a in the longitudinal direction D1 is located at the basal side of the inner edge 271e of the annular groove 27a in the longitudinal direction D1. The inner edge 271e conforms to the edge portion at the radially outer side of the receiving portion 271. Otherwise, the structure is the same as the compressor of the first embodiment.

The compressor of third embodiment having such configuration also has advantages similar to the compressor of first embodiment.

Fourth Embodiment

Figure 11:
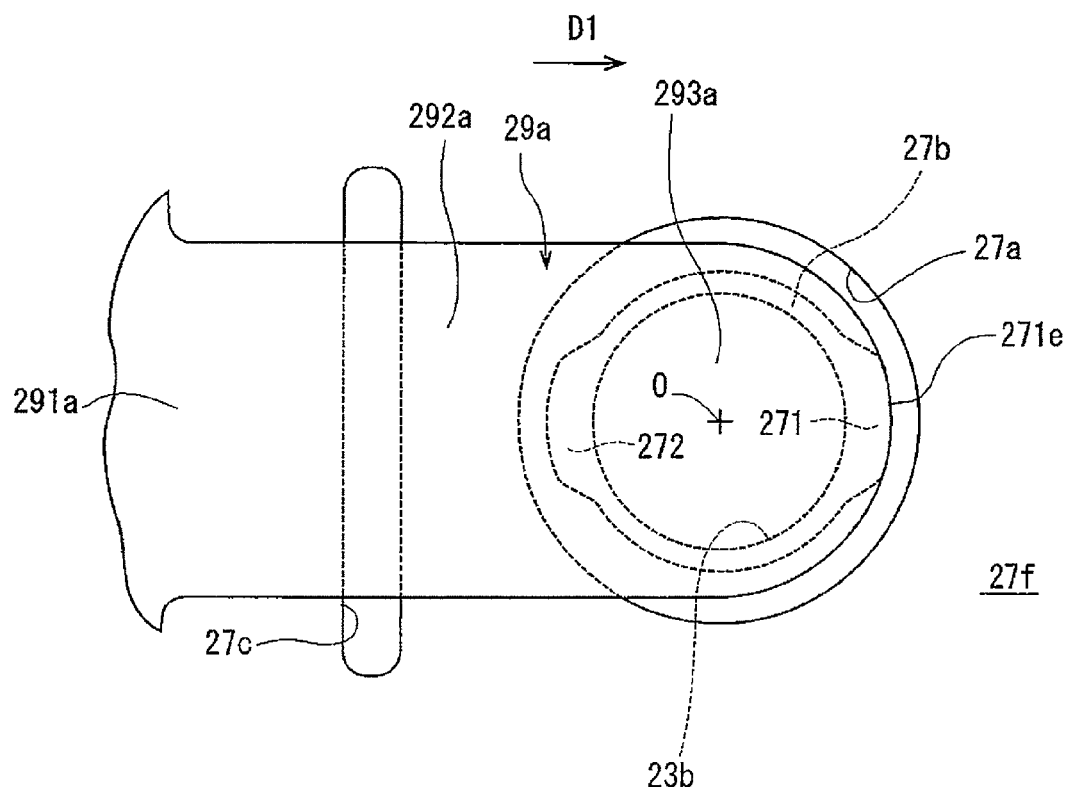
FIG. 11 is an enlarged plan view showing a state in which the discharge reed valve closes the discharge port in a compressor according to a fourth embodiment of the present invention.
Figure 12:
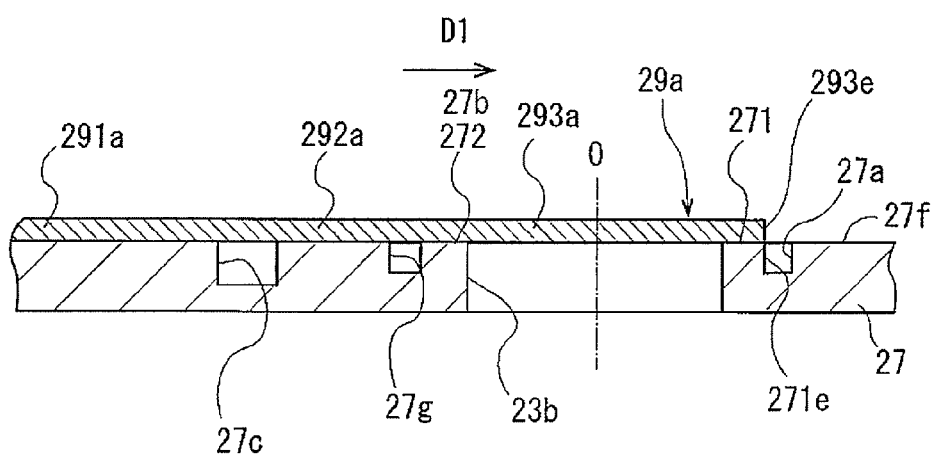
FIG. 12 is an enlarged cross-sectional view showing a state in which the discharge reed valve closes the discharge port in the compressor of FIG. 11.

In a compressor of a fourth embodiment, as shown in FIGS. 11 and 12, a portion of the valve seat surface 27b at the distal side in the longitudinal direction D1 is the receiving portion 271, and a portion at the basal side in the longitudinal direction D1 is a receiving portion 272. The two receiving portions 271 and 272 are bulged further outward toward the distal side and the basal side in the longitudinal direction D1 from other parts of the valve seat surface 27b. Thus, with regard to the area per unit length in the circumferential direction of the discharge port 23b, the receiving portions 271 and 272 have a larger area than other parts of the valve seat surface 27b. Otherwise, the structure is the same as the compressor of the first embodiment.

In this compressor, when the intermediate portion 282a of the discharge reed valve 29a strikes the receiving portion 272, only a small stress acts on the intermediate portion 292a due to the large receiving portion 272. This effectively prevents damages of the discharge reed valve 29a and obtains superior durability. The other advantages are the same as the first embodiment.

Fifth Embodiment

Figure 13:
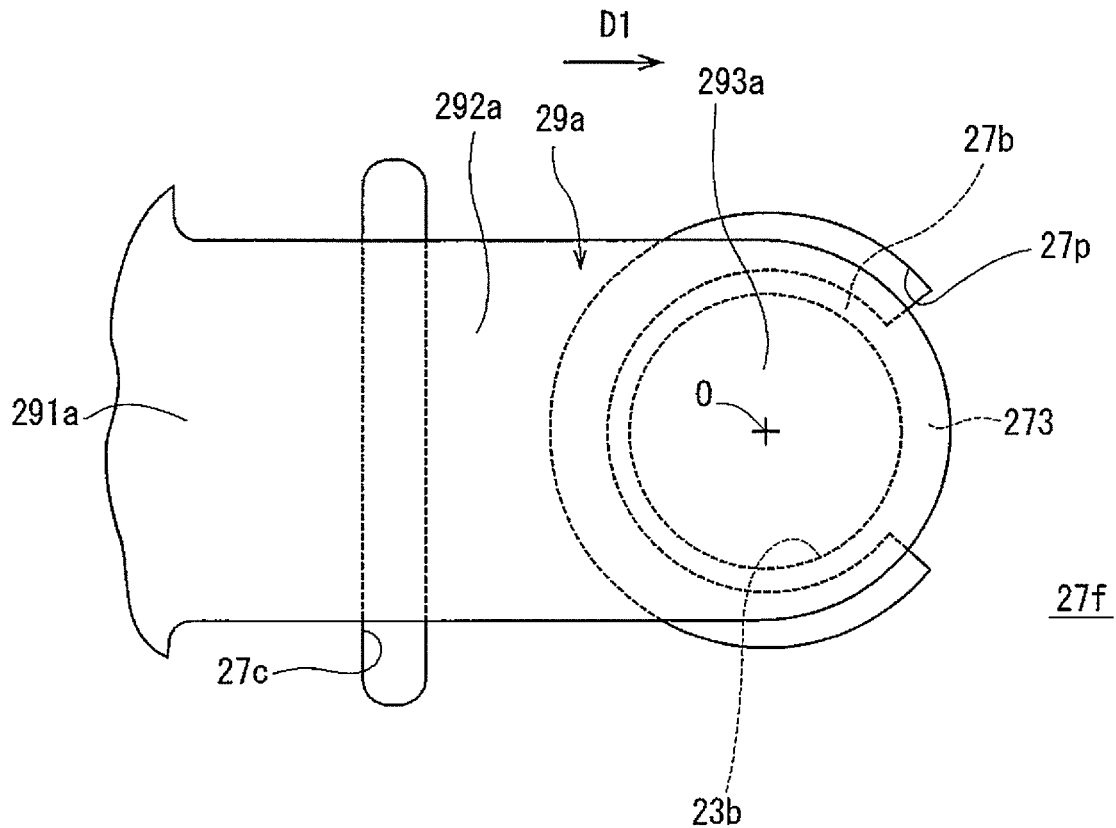
FIG. 13 is an enlarged plan view showing a state in which the discharge reed valve closes the discharge port in a compressor according to a fifth embodiment of the present invention.
Figure 14:
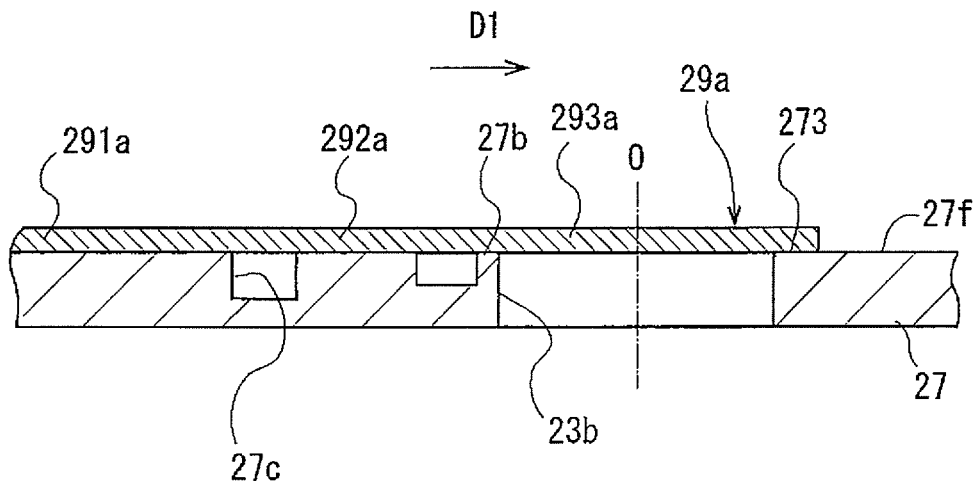
FIG. 14 is an enlarged cross-sectional view showing a state in which the discharge reed valve closes the discharge port in the compressor of FIG. 13.

In a compressor of a fifth embodiment, as shown in FIGS. 13 and 14, a first groove portion 27p, which is C-shaped as viewed from above and surrounds the portions at the basal side and left and right sides of the discharge port 23b, is arranged in the fixing surface 27f. Thus, the portion of the fixing surface 27f at the distal side in the longitudinal direction D1 forms a receiving portion 273. In other words, the receiving portion 273 is bulged further toward the distal side of the longitudinal direction D1 than other parts of the valve seat surface 27b and is continuous with the fixing surface 27f. Otherwise, the structure is the same as the compressor of the first embodiment.

In this compressor, the distance between the opposing ends of the first groove portion 27p, which is C-shaped as viewed from above, can be increased to enlarge the receiving portion 273. When the valve portion 293a of the discharge reed valve 29a strikes the receiving portion 273, the lubricating oil on the large receiving portion 273 ensures that the striking force is decreased. Thus, only a small stress acts on the valve portion 293a, and a large stress is not produced at the distal end of the valve portion 293a. As a result, this compressor also effectively prevents damages of the discharge reed valve 29a and obtains superior durability. The other advantages are the same as the first embodiment.

Sixth Embodiment

Figure 15:
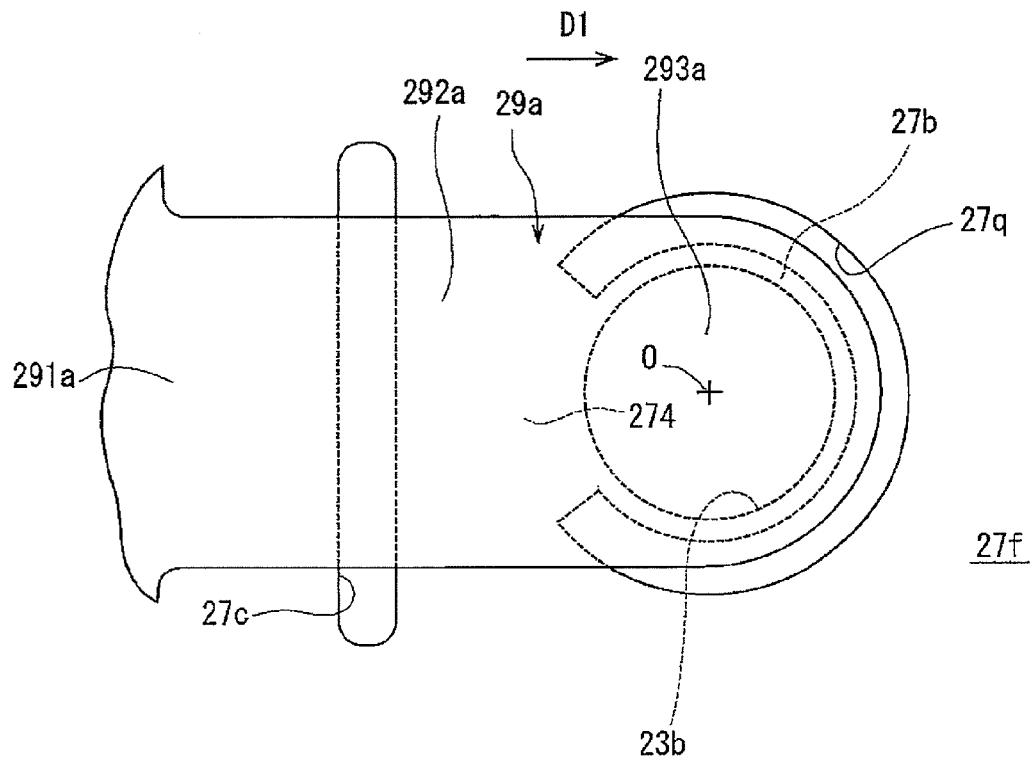
FIG. 15 is an enlarged plan view showing a state in which the discharge reed valve closes the discharge port in a compressor according to a sixth embodiment of the present invention.
Figure 16:
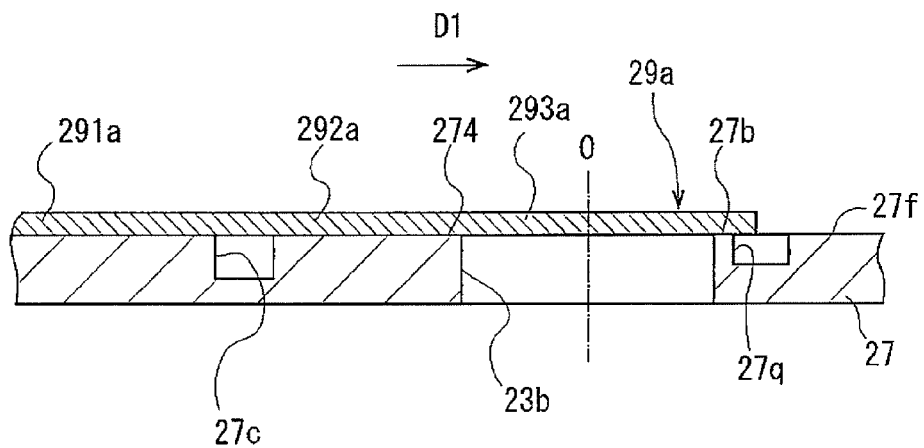
FIG. 16 is an enlarged cross-sectional view showing a state in which the discharge reed valve closes the discharge port in the compressor of FIG. 15.

In a compressor of a sixth embodiment, as shown in FIG. 15 and FIG. 16, a first groove portion 27q, which is reversed C-shaped as viewed from above and surrounds the portions at the distal side and left and right sides of the discharge port 23b, is arranged in the fixing surface 27f. Thus, the portion of the fixing surface 27f at the basal side in the longitudinal direction D1 forms a receiving portion 274. In other words, the receiving portion 274 is bulged further toward the basal side of the longitudinal direction D1 than other parts of the valve seat surface 27b and is continuous with the fixing surface 27f. Otherwise, the structure is the same as the compressor of the first embodiment.

In this compressor, when the intermediate portion 292a of the discharge reed valve 29a strikes the receiving portion 274, only a small stress acts on the intermediate portion 292a due to the large receiving portion 274. As a result, this compressor also effectively prevents damages of the discharge reed valve 29a and obtains superior durability. The other advantages are the same as the first embodiment.

Seventh Embodiment

Figure 17:
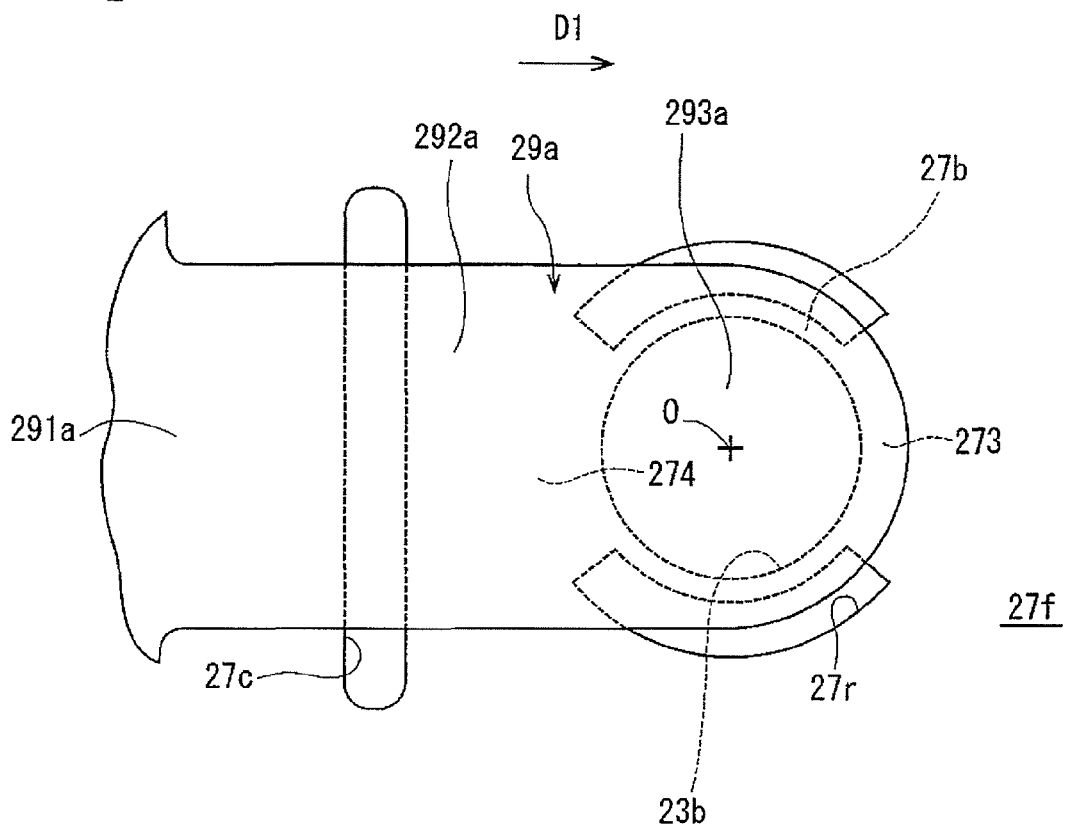
FIG. 17 is an enlarged plan view showing a state in which the discharge reed valve closes the discharge port in a compressor according to a seventh embodiment of the present invention.
Figure 18:
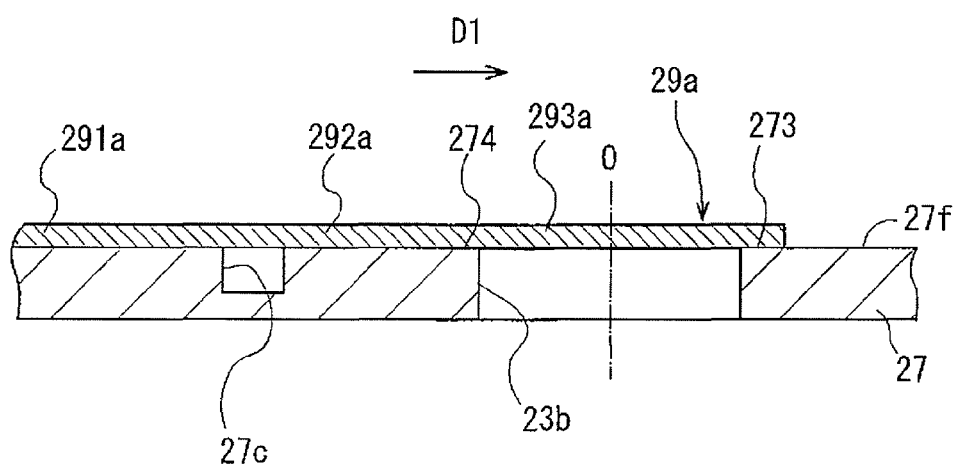
FIG. 18 is an enlarged cross-sectional view showing a state in which the discharge reed valve closes the discharge port in the compressor of FIG. 17.

In a compressor of a seventh embodiment, as shown in FIGS. 17 and 18, a first groove portion 27r, which is arc-shaped and surrounds the left and the right sides of the discharge port 23b, is arranged in the fixing surface 27f. Thus, the portion of the fixing surface 27f at the distal side in the longitudinal direction D1 forms the receiving portion 273 and the portion at the basal side forms the receiving portion 274. Otherwise, the structure is the same as the compressor of the first embodiment.

In this compressor, when the intermediate portion 292a of the discharge reed valve 29a strikes the receiving portion 274, only a small stress acts on the intermediate portion 292a due to the large receiving portion 274. Further, when the valve portion 293a strikes the receiving portion 273, only a small stress acts on the valve portion 293a due to the large receiving portion 273. As a result, this compressor further effectively prevents damages of the discharge reed valve 29a and obtains superior durability. The other advantages are the same as the first embodiment.

Eighth Embodiment

Figure 19:
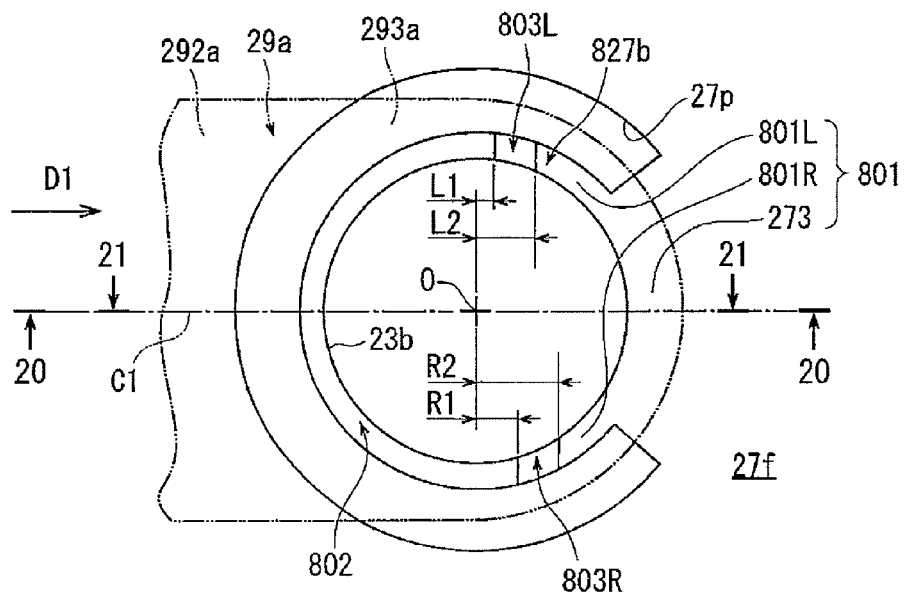
FIG. 19 is an enlarged plan view showing a valve seat surface including a first surface, a second surface, and inclined surfaces in a compressor according to an eighth embodiment of the present invention.
Figure 20:
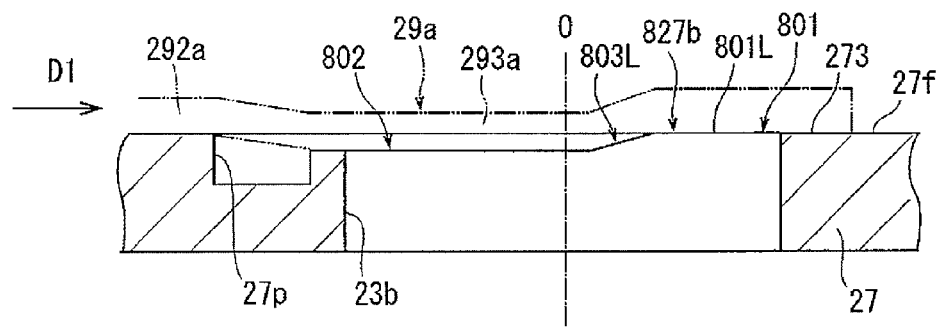
FIG. 20 is an enlarged cross-sectional view taken along line 20-20 in FIG. 19.
Figure 21:
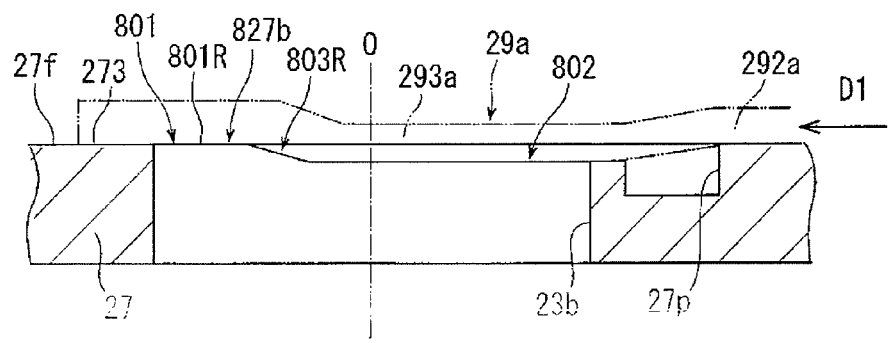
FIG. 21 is an enlarged cross-sectional view taken along line 21-21 in FIG. 19.

As shown in FIGS. 13 and 14, in the compressor of fifth embodiment, the entire valve seat surface 27b is flush with the fixing surface 27f outside the first groove portion 27p. In contrast, in a compressor of an eighth embodiment, as shown in FIGS. 19 to 21, a valve seat surface 827b includes a first surface 801, a second surface 802, and two inclined surfaces 803L and 803R. Other parts, such as the first groove portion 27p, the second groove portion 27c, and the receiving portion 273 are the same as the compressor of the fifth embodiment.

As shown in FIG. 19, when viewing the valve seat surface 827b from above, the first surface 801 includes the receiving portion 273, which is the portion of the fixing surface 27f at the distal side in the longitudinal direction D1, and two arc portions 801L and 801R, which extend from the receiving portion 273 so as to surround the distal portion of the discharge port 23b. As shown in FIGS. 20 and 21, the receiving portion 273 is flush with the arc portions 801L and 801R.

As shown in FIG. 19, the second surface 802 surrounds the discharge port 23b in an arc-shaped manner between the discharge port 23b and the part of the first groove portion 27p at the basal side in the longitudinal direction D1. The two ends of the second surface 802 extend toward the arc portions 801L and 801R, respectively. As shown in FIGS. 20 and 21, the second surface 802 is lower than the first surface 801. The difference in height of the first surface 801 and the second surface 802 is set to be small so that the valve portion 293a can come into contact with the entire valve seat surface 827b without being excessively deformed. In the present embodiment, the second surface 802 is lower than the first surface 801 by about 20 µm.

As shown in FIG. 19, the two inclined surfaces 803L and 803R are respectively located between the arc portions 801L and 801R of the first surface 801 and the second surface 802. The portions of the inclined surfaces 803L and 803R at the basal side of the longitudinal direction D1 are each connected to the second surface 802, and the distal sides of the longitudinal direction D1 in the inclined surfaces 803L and 803R are respectively connected to the arc portions 801L and 801R. As shown in FIGS. 20 and 21, the inclined surfaces 803L and 803R are gradually inclined from the second surface 802 to the arc portions 801L and 801R, respectively, so that the height changes gradually.

Referring to FIG. 19, when a hypothetic center line C1 is set extending along the longitudinal direction D1, an upper side of the center line C1 in the plane of FIG. 19 is the left side, and a lower side of the center line C1 is the right side. The distance in the longitudinal direction D1 between the center O of the discharge port 23b and a basal end of the left inclined surface 803L is L1. The distance in the longitudinal direction D1 between the center O and a distal end of the left inclined surface 803L is L2. Further, the distance in the longitudinal direction D1 between the center O and a basal end of the right inclined surface 803R is R1. The distance in the longitudinal direction D1 between the center O and a distal end of the right inclined surface 803R is R2. Here, the distance L1 is shorter than the distance R1, and the distance L2 is shorter than the distance R2. In other words, the valve seat surface 827b is asymmetric to the left and right of the center line C1.

In the compressor, the second surface 802 is lower than the first surface 801. Thus, in comparison with the compressor of the fifth embodiment in which the entire valve seat surface 27b is flush with the fixing surface 27f outside the first groove portion 27p, at the moment the discharge reed valve 29a closes the discharge port 23b, the timing can be delayed at which the valve portion 293a starts to strike the second surface 802. This delays the timing the stress waves, which are produced when the valve portion 293a strikes the second surface 802, is propagated to the receiving portion 273 in the first surface 801. The part at the basal side of the valve portion 293a bends along the second surface 802 and the two inclined surfaces 803L and 803R thereby gradually closing the discharge port 23b from the basal side. This reduces the impact when the distal end of the valve portion 293a strikes the receiving portion 273. Further, in this compressor, the heights of the inclined surfaces 803L and 803R gradually change from the second surface 802 to the first surface 801. Thus, the stress waves produced when the valve portion 293a strikes the second surface 802 is not amplified when passing by the inclined surfaces 803L and 803R. This further prevents a large stress from being produced at the distal end of the valve portion 293a in the compressor.

Further, in this compressor, the valve seat surface 827b is asymmetric to the left and right of the center line C1. When the stress wave produced as the valve portion 293a strikes the second surface 802 is propagated toward the distal side, the phases of the stress wave propagated from the second surface 802 along the left inclined surface 803L and the arc portion 801L, and the stress wave propagated from the second surface 802 along the right inclined surface 803R and the arc portion 801R are shifted, and the stress waves are propagated to the receiving portion 273 formed in the first surface 801. As a result, the stress waves of shifted phases merge at the receiving portion 273 thus canceling each other thereby making it more difficult for a large stress to be produced at the distal end of the valve portion 293a. As a result, the compressor can further effectively prevent damage of the discharge reed valve 29a and ensures that superior durability is obtained. The other advantages are the same as the first and fifth embodiments.

Ninth Embodiment

Figure 22:
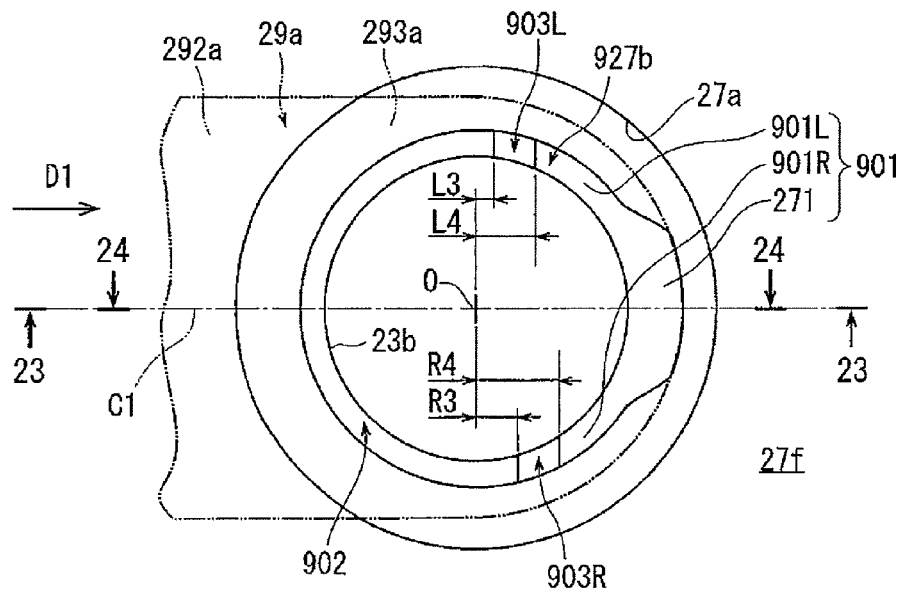
FIG. 22 is an enlarged plan view showing a valve seat surface including a first surface, a second surface, and inclined surfaces in a compressor according to a ninth embodiment of the present invention.
Figure 23:
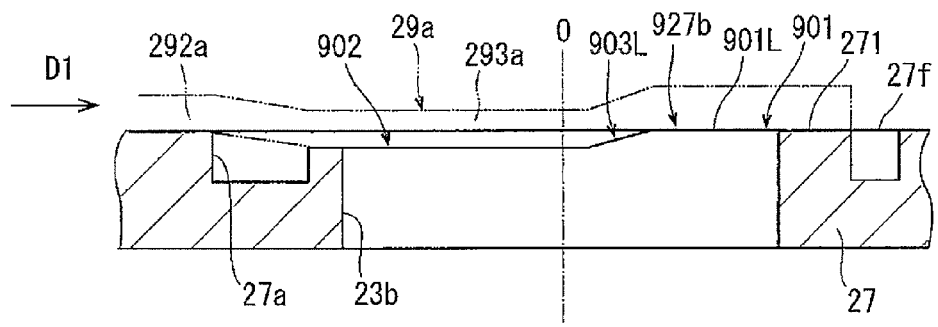
FIG. 23 is an enlarged cross-sectional view taken along line 23-23 in FIG. 22.
Figure 24:
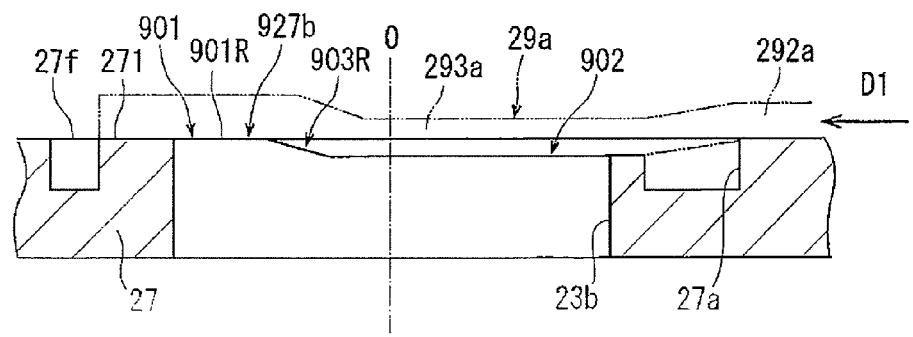
FIG. 24 is an enlarged cross-sectional view taken along line 24-24 in FIG. 22.
Figure 25:
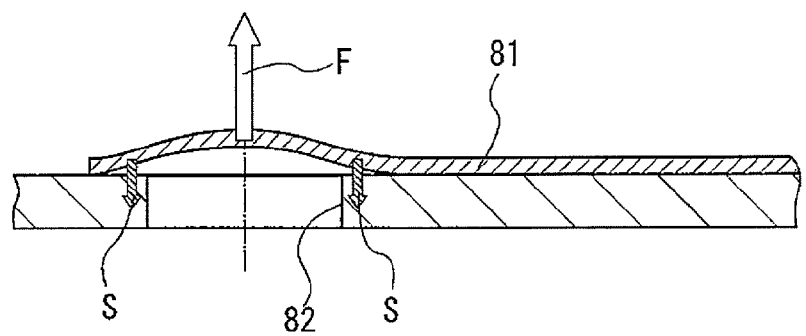
FIG. 25 is a cross-sectional view illustrating adhesive force and the like that acts on a discharge reed valve.
Figure 26:
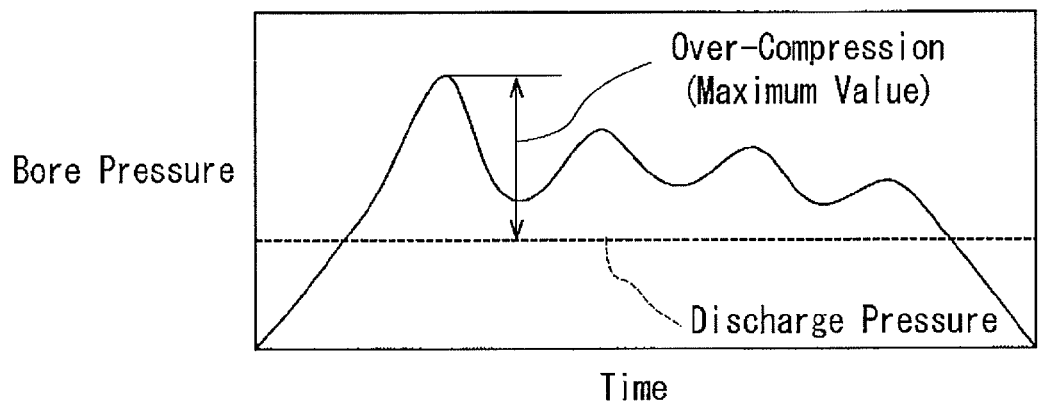
FIG. 26 is a graph showing the relationship of time and bore inner pressure in a compressor.
Figure 27:
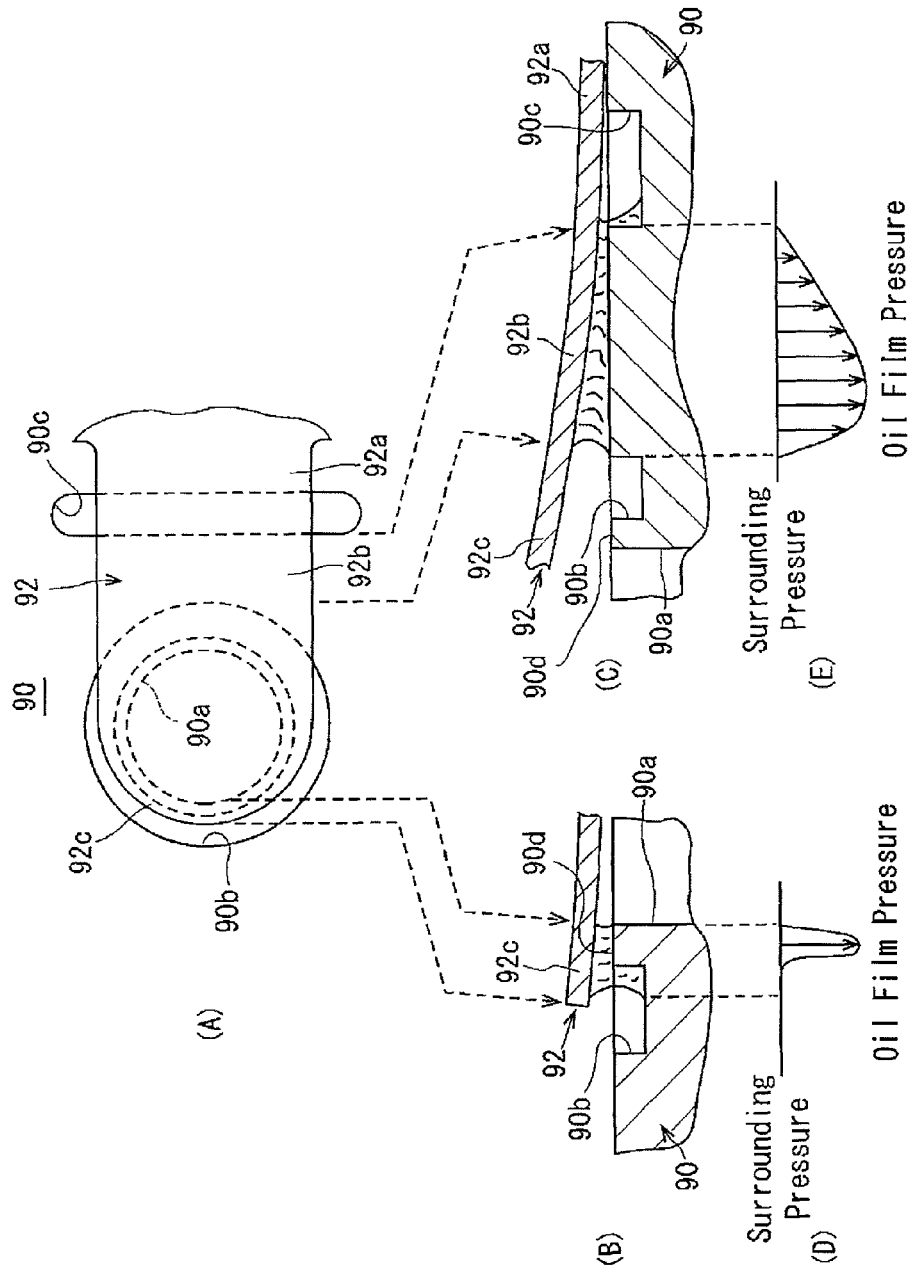
FIG. 27 shows a conventional compressor, in which part (A) shows a plan view of the compressor, parts (B) and (C) show enlarged cross-sectional views of the compressor, and parts (D) and (E) show graphs indicating oil film pressure.
Figure 28:
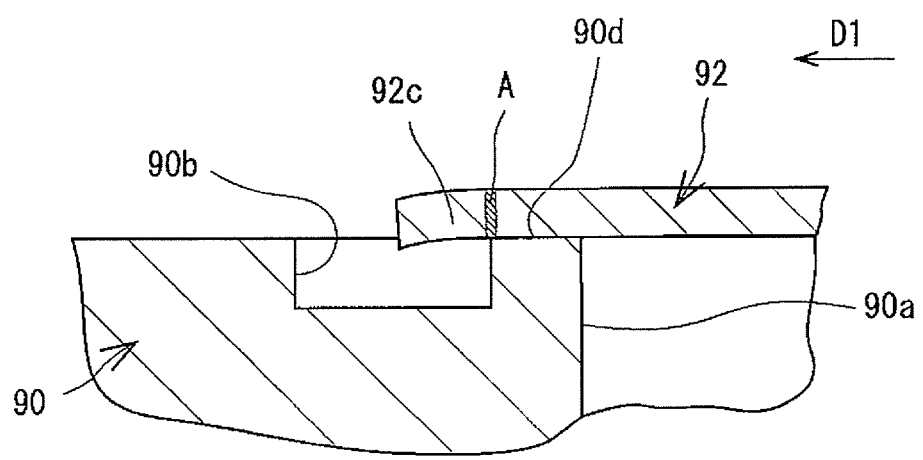
FIG. 28 is an enlarged cross-sectional view of the conventional compressor showing a state in which a discharge port is closed by a discharge reed valve.

As shown in FIGS. 4 and 5, in the compressor of the first embodiment, the entire valve seat surface 27b is flush with the fixing surface 27f outside the first groove portion 27a. In contrast, in a compressor of a ninth embodiment, as shown in FIGS. 22 to 24, a valve seat surface 927b includes a first surface 901, a second surface 902, and two inclined surfaces 903L and 903R. Other parts, such as the first groove portion 27a, the second groove portion 27c, the receiving portion 271, and the like, are the same as the compressor of first embodiment.

As shown in FIG. 22, when viewing the valve seat surface 927b from above, the first surface 901 is located between the discharge port 23b and the part of the first groove portion 27a at the distal side in the longitudinal direction D1. The first surface 901 includes the receiving portion 271, which bulges toward the distal side of the longitudinal direction D1, and two arc portions 901L and 901R, which extend from the receiving portion 271 so as to surround the distal portion of the discharge port 23b. As shown in FIGS. 23 and 24, the receiving portion 271 is flush with the arc portions 901L and 901R.

The second surface 902 has the same structure as the second surface 802 of the eighth embodiment and thus will not be described. As shown in FIG. 22, the second surface 902 surrounds the discharge port 23b in an arc-shaped manner between the discharge port 23b and the part of the first groove portion 27a at the basal side in the longitudinal direction D1. The second surface 902 is lower than the first surface 901, as shown in FIGS. 23 and 24.

The two inclined surfaces 903L and 903R have the same structure as the inclined surfaces 803L and 803R of the eighth embodiment and thus will not be described. As shown in FIGS. 22 to 24, the inclined surfaces 903L and 903R are located between the arc portions 901L and 901R of the first surface 901 and the second surface 902, respectively, and have heights that gradually change from the second surface 902 to the arc portions 901L and 901R.

As shown in FIG. 22, it is assumed here that the distance in the longitudinal direction D1 between the center O of the discharge port 23b and a basal end of the left inclined surface 903L is L3. The distance in the longitudinal direction D1 between the center O and a distal end of the left inclined surface 903L is L4. Further, the distance in the longitudinal direction D1 between the center O and a basal end of the right inclined surface 903R is R3. The distance in the longitudinal direction D1 between the center O and a distal end of the right inclined surface 903R is R4. The distance L3 is shorter than the distance R3, and the distance L4 is shorter than the distance R4. In other words, the valve seat surface 927b is also asymmetric to the left and right of the center line C1 in the same manner as the valve seat surface 827b of the eighth embodiment.

The compressor of the ninth embodiment has the same advantages as the compressor of the eighth embodiment.

The present invention has been described through the first to ninth embodiments. However, the present invention is not limited to the first to ninth embodiments and may be modified as required within the scope of the invention.

For instance, the second groove portion 27c is deeper than the annular groove 27a in the first embodiment, and the annular groove 27a, the second groove portion 27c, and the communication groove 301 have the same depths in the second embodiment. However, the depths are not limited in such a manner.

A communication groove that is similar to the communication groove 301 of the second embodiment may be arranged in between the first groove portions 27p and 27a and the second groove portion 27c in the compressors of the eighth and ninth embodiments to communicate the first groove portions 27p and 27a and the second groove portion 27c.

In the eighth embodiment, the distance L1 is equal to the distance R1, and the distance L2 is equal to the distance R2. Thus, the valve seat surface 827b is symmetric to the left and right of the center line C1. The present invention also includes such a structure. In the same manner, in the ninth embodiment, the present invention includes a structure in which the distance L3 is equal to the distance R3, and the distance L4 is equal to the distance R4.

The present invention can be used in a preferred manner in an air conditioning system for a vehicle.

The invention claimed is:

1. A compressor comprising:
   a discharge chamber;
   a compression chamber;
   a partition wall arranged between the discharge chamber and the compression chamber and including a fixing surface facing the discharge chamber, wherein the partition wall includes a discharge port that communicates the discharge chamber and the compression chamber, when viewing the partition wall from above, the discharge port has a circular shape; and
   a discharge reed valve having a length extending along a longitudinal direction, a distal end, and a basal end, the discharge reed valve including a fixed portion located at the basal end and fixed to the fixing surface, an intermediate portion extending from the fixed portion along the longitudinal direction toward the distal end and being liftable relative to the fixing surface, and a valve portion further extending from the intermediate portion along the longitudinal direction toward the distal end and being capable of opening and closing the discharge port, wherein
   the fixing surface includes a first groove portion, which extends around the discharge port, and a valve seat surface, which is arranged between the discharge port and the first groove portion, the valve portion comes into contact with the valve seat surface to close the discharge port, and when viewing the discharge reed valve from above in a state closing the discharge port, the first groove portion extends to a range overlapped with the intermediate portion;
   when viewing the valve portion from above in a state closing the discharge port, a part of the valve portion at a distal side in the longitudinal direction is formed not to close the first groove portion; and the valve seat surface includes a receiving portion located in a distal side in the longitudinal direction, the receiving portion bulges further radially outward from the discharge port than other portions of the valve seat surface, the receiving portion extends into the first groove portion and narrows the width of the first groove portion, and the receiving portion bulges further toward the distal side in the longitudinal direction than other portions in the valve seat surface.

2. The compressor according to claim 1, wherein the first groove portion is an annular groove surrounding the discharge port in a circumferential direction.

3. The compressor according to claim 1, wherein the first groove portion has a C-shaped form surrounding the discharge port in a circumferential direction.

4. The compressor according to claim 1, wherein
the valve seat surface includes a first surface, which is located at a distal side of the discharge reed valve in the longitudinal direction and which is flush with a portion of the fixing surface outside the first groove portion, a second surface, which is located at a basal side of the discharge reed valve in the longitudinal direction and which has a lower height than the first surface, and an inclined surface, which is located between the first surface and the second surface and has a height that gradually changes from the second surface to the first surface; and
the receiving portion is formed in the first surface.

5. The compressor according to claim 4, wherein when a hypothetic center line is set along the longitudinal direction, the valve seat surface is asymmetric to the left and right of the center line.

6. The compressor according to claim 1, wherein
the fixing surface includes a second groove located at a basal side of the discharge port in the longitudinal direction, and
when viewing the discharge reed valve from above in a state closing the discharge port, the second groove extends across the intermediate portion in a lateral direction.

7. The compressor according to claim 6, wherein when viewing the discharge reed valve from above in a state closing the discharge port, the fixing surface includes a communication groove located in a range overlapping the intermediate portion and extending along the longitudinal direction to communicate the first groove portion and the second groove portion.

* * * * *